United States Patent
Kuttimalai et al.

(10) Patent No.: US 12,536,479 B2
(45) Date of Patent: Jan. 27, 2026

(54) METHODS AND SYSTEMS FOR SOLVING AN OPTIMIZATION PROBLEM USING A FLEXIBLE MODULAR APPROACH

(71) Applicant: 1QB Information Technologies Inc., North Vancouver (CA)

(72) Inventors: Silvan Shiwa Kuttimalai, Vancouver (CA); Maliheh Aramon Bajestani, Vancouver (CA); Gilad Amir Rosenberg, Vancouver (CA); Nathan Andrew Rose, Vancouver (CA); Bradley David Woods, Vancouver (CA)

(73) Assignee: 1QB INFORMATION TECHNOLOGIES INC.

( * ) Notice: Subject to any disclaimer, the term of this patent is extended or adjusted under 35 U.S.C. 154(b) by 450 days.

(21) Appl. No.: 18/058,005

(22) Filed: Nov. 22, 2022

(65) Prior Publication Data
US 2023/0077665 A1   Mar. 16, 2023

Related U.S. Application Data

(63) Continuation of application No. PCT/CA2021/050709, filed on May 26, 2021.
(Continued)

(51) Int. Cl.
*G06Q 10/04* (2023.01)
(52) U.S. Cl.
CPC .................................. *G06Q 10/04* (2013.01)
(58) Field of Classification Search
CPC .......... G06F 17/11; G06F 3/048; G06Q 10/04
See application file for complete search history.

(56) References Cited

U.S. PATENT DOCUMENTS

| 6,221,592 B1 | 4/2001 | Schwartz et al. |
| 7,113,967 B2 | 9/2006 | Cleve et al. |
| (Continued) | | |

FOREIGN PATENT DOCUMENTS

| CA | 2840958 A1 | 1/2013 |
| CA | 2881033 A1 | 4/2015 |
| (Continued) | | |

OTHER PUBLICATIONS

Aggarwal et al.: Evolutionary network analysis: A survey. ACM Computing Surveys 47(1):10:1-10:36 (2014).
(Continued)

*Primary Examiner* — Vincent H Tran
(74) *Attorney, Agent, or Firm* — WILSON SONSINI GOODRICH & ROSATI

(57) ABSTRACT

A method for solving an optimization problem inputted by a user may include: (a) using an interface of a digital computer to receive an indication of (i) said optimization problem, (ii) one or more optimization problem specifications of a plurality of optimization problem specifications, (iii) at least one generation method and at least one evaluation method, (iv) one or more algorithms of a plurality of algorithms, wherein said one or more algorithms is configured to solve said optimization problem subject to at least said one or more optimization problem specifications using said at least one generation method and said at least one evaluation method, and (v) one or more computational platforms of a plurality of computational platforms, wherein said one or more computational platforms is configured to execute said one or more algorithms; (b) using said one or more computational platforms to execute said one or more algorithms to yield a solution to said optimization problem; and (c) providing said solution to said optimization problem from said computational platform at said interface.

20 Claims, 7 Drawing Sheets

Related U.S. Application Data

(60) Provisional application No. 63/030,803, filed on May 27, 2020.

(56) References Cited

U.S. PATENT DOCUMENTS

| | | | |
|---|---|---|---|
| 7,135,701 | B2 | 11/2006 | Amin et al. |
| 7,234,144 | B2 | 6/2007 | Wilt et al. |
| 7,418,283 | B2 | 8/2008 | Amin et al. |
| 7,424,451 | B1 * | 9/2008 | Moore .................. G06Q 40/00 |
| | | | 705/37 |
| 7,533,068 | B2 | 5/2009 | Maassen et al. |
| 7,619,437 | B2 | 11/2009 | Thom et al. |
| 7,639,035 | B2 | 12/2009 | Berkley |
| 7,660,533 | B1 | 2/2010 | Meyers et al. |
| 7,805,079 | B1 | 9/2010 | Meyers et al. |
| 7,877,333 | B2 | 1/2011 | Macready |
| 7,898,282 | B2 | 3/2011 | Harris et al. |
| 7,984,012 | B2 | 7/2011 | Coury et al. |
| 8,008,942 | B2 | 8/2011 | Van Den Brink et al. |
| 8,010,477 | B2 * | 8/2011 | Rogers ..................... G06N 5/04 |
| | | | 706/47 |
| 8,126,649 | B2 | 2/2012 | Frasch et al. |
| 8,175,995 | B2 | 5/2012 | Amin |
| 8,195,596 | B2 | 6/2012 | Rose et al. |
| 8,195,726 | B2 | 6/2012 | Macready et al. |
| 8,219,605 | B2 | 7/2012 | Cowlishaw et al. |
| 8,230,432 | B2 | 7/2012 | Bryant et al. |
| 8,244,504 | B1 | 8/2012 | Jacobs |
| 8,244,662 | B2 | 8/2012 | Coury et al. |
| 8,283,943 | B2 | 10/2012 | Van Den Brink et al. |
| 8,374,828 | B1 | 2/2013 | Jacobs et al. |
| 8,421,053 | B2 | 4/2013 | Bunyk et al. |
| 8,503,885 | B2 | 8/2013 | Meyers et al. |
| 8,655,828 | B2 | 2/2014 | Rose |
| 8,832,165 | B2 | 9/2014 | Allen et al. |
| 9,537,953 | B1 | 1/2017 | Dadashikelayeh et al. |
| 9,660,859 | B1 | 5/2017 | Dadashikelayeh et al. |
| 9,727,824 | B2 | 8/2017 | Rose et al. |
| 9,870,273 | B2 | 1/2018 | Dadashikelayeh et al. |
| 9,881,256 | B2 | 1/2018 | Hamze et al. |
| 10,044,638 | B2 | 8/2018 | Dadashikelayeh et al. |
| 10,152,358 | B2 | 12/2018 | Dadashikelayeh et al. |
| 10,223,084 | B1 | 3/2019 | Dunn |
| 10,339,466 | B1 | 7/2019 | Ding et al. |
| 10,346,748 | B2 | 7/2019 | Aspuru-Guzik et al. |
| 10,484,479 | B2 | 11/2019 | Johnson et al. |
| 10,558,932 | B1 | 2/2020 | Neven et al. |
| 10,614,370 | B2 | 4/2020 | Johnson et al. |
| 10,713,582 | B2 | 7/2020 | Dadashikelayeh |
| 10,740,430 | B2 * | 8/2020 | Iorio ....................... G06Q 10/06 |
| 10,824,478 | B2 | 11/2020 | Dadashikelayeh et al. |
| 10,826,845 | B2 | 11/2020 | Dadashikelayeh et al. |
| 10,929,294 | B2 | 2/2021 | Brahm et al. |
| 11,017,289 | B2 | 5/2021 | Crawford et al. |
| 11,196,775 | B1 | 12/2021 | Badawy et al. |
| 11,205,275 | B2 | 12/2021 | Oami et al. |
| 11,514,134 | B2 | 11/2022 | Ronagh et al. |
| 11,797,641 | B2 | 10/2023 | Ronagh et al. |
| 2003/0005068 | A1 | 1/2003 | Nickel et al. |
| 2003/0121028 | A1 | 6/2003 | Coury et al. |
| 2004/0254735 | A1 | 12/2004 | Horn et al. |
| 2004/0267916 | A1 | 12/2004 | Chambliss et al. |
| 2005/0027458 | A1 | 2/2005 | Merz et al. |
| 2005/0182614 | A1 | 8/2005 | Meredith |
| 2005/0187844 | A1 | 8/2005 | Chalermkraivuth et al. |
| 2005/0250651 | A1 | 11/2005 | Amin et al. |
| 2005/0273306 | A1 | 12/2005 | Hilton et al. |
| 2006/0221978 | A1 | 10/2006 | Venkatachalam |
| 2006/0225165 | A1 | 10/2006 | Maassen van den Brink et al. |
| 2007/0177634 | A1 | 8/2007 | Beausoleil et al. |
| 2007/0180586 | A1 | 8/2007 | Amin |
| 2007/0215862 | A1 | 9/2007 | Beausoleil et al. |
| 2007/0239366 | A1 | 10/2007 | Hilton et al. |
| 2008/0059547 | A1 | 3/2008 | Taylor |
| 2008/0065573 | A1 | 3/2008 | Macready |
| 2008/0186918 | A1 | 8/2008 | Tinnakornsrisuphap et al. |
| 2008/0215850 | A1 | 9/2008 | Berkley et al. |
| 2008/0218519 | A1 | 9/2008 | Coury et al. |
| 2008/0262990 | A1 | 10/2008 | Kapoor et al. |
| 2008/0313430 | A1 | 12/2008 | Bunyk |
| 2009/0050357 | A1 | 2/2009 | Suzuki |
| 2009/0070402 | A1 | 3/2009 | Rose et al. |
| 2009/0078932 | A1 | 3/2009 | Amin |
| 2009/0164435 | A1 | 6/2009 | Routt |
| 2009/0182542 | A9 | 7/2009 | Hilton et al. |
| 2009/0306902 | A1 | 12/2009 | Lemmen et al. |
| 2009/0325694 | A1 | 12/2009 | Beckman et al. |
| 2010/0076913 | A1 | 3/2010 | Yang et al. |
| 2010/0261481 | A1 | 10/2010 | Resende et al. |
| 2010/0306142 | A1 | 12/2010 | Amin |
| 2011/0047201 | A1 | 2/2011 | Macready et al. |
| 2011/0231462 | A1 | 9/2011 | Macready et al. |
| 2011/0238378 | A1 | 9/2011 | Allen et al. |
| 2011/0238855 | A1 | 9/2011 | Korsunsky et al. |
| 2011/0296229 | A1 | 12/2011 | Cowlishaw et al. |
| 2012/0072579 | A1 | 3/2012 | Teather |
| 2012/0084242 | A1 | 4/2012 | Levin |
| 2012/0159506 | A1 | 6/2012 | Barham et al. |
| 2012/0215821 | A1 | 8/2012 | Macready et al. |
| 2012/0240185 | A1 | 9/2012 | Kapoor et al. |
| 2012/0253926 | A1 | 10/2012 | Chen et al. |
| 2012/0254586 | A1 | 10/2012 | Amin et al. |
| 2012/0278374 | A1 | 11/2012 | Cowlishaw et al. |
| 2012/0326720 | A1 | 12/2012 | Gambetta et al. |
| 2013/0026183 | A1 | 1/2013 | Foster |
| 2013/0144925 | A1 | 6/2013 | Macready et al. |
| 2013/0263131 | A1 | 10/2013 | Beda, III et al. |
| 2013/0308956 | A1 | 11/2013 | Meyers et al. |
| 2013/0336472 | A1 | 12/2013 | Fahlgren et al. |
| 2014/0025606 | A1 | 1/2014 | Macready |
| 2014/0067342 | A1 | 3/2014 | Calderon |
| 2014/0067808 | A1 | 3/2014 | Narang et al. |
| 2014/0122702 | A1 | 5/2014 | Jung et al. |
| 2014/0123325 | A1 | 5/2014 | Jung et al. |
| 2014/0187427 | A1 | 7/2014 | Macready et al. |
| 2014/0214257 | A1 | 7/2014 | Williams et al. |
| 2014/0250288 | A1 | 9/2014 | Roy |
| 2014/0258730 | A1 | 9/2014 | Stecher |
| 2014/0324933 | A1 | 10/2014 | Macready et al. |
| 2014/0337612 | A1 | 11/2014 | Williams |
| 2014/0344322 | A1 | 11/2014 | Ranjbar |
| 2014/0365843 | A1 | 12/2014 | Ashikhmin |
| 2014/0379924 | A1 | 12/2014 | Das et al. |
| 2015/0006443 | A1 | 1/2015 | Rose et al. |
| 2015/0032991 | A1 | 1/2015 | Lanting et al. |
| 2015/0032993 | A1 | 1/2015 | Amin et al. |
| 2015/0055961 | A1 | 2/2015 | Meyers et al. |
| 2015/0106413 | A1 | 4/2015 | Ronagh |
| 2015/0111754 | A1 | 4/2015 | Harris et al. |
| 2015/0120551 | A1 | 4/2015 | Jung et al. |
| 2015/0120555 | A1 | 4/2015 | Jung et al. |
| 2015/0142398 | A1 | 5/2015 | Miller, III et al. |
| 2015/0169746 | A1 | 6/2015 | Hatami-Hanza |
| 2015/0178349 | A1 | 6/2015 | Niewodniczanski et al. |
| 2015/0193692 | A1 | 7/2015 | Israel |
| 2015/0205759 | A1 | 7/2015 | Israel et al. |
| 2015/0220852 | A1 | 8/2015 | Hatami-Hanza |
| 2015/0227559 | A1 | 8/2015 | Hatami-Hanza |
| 2015/0262074 | A1 | 9/2015 | Bruestle et al. |
| 2015/0269124 | A1 | 9/2015 | Hamze et al. |
| 2015/0269243 | A1 | 9/2015 | Kobayashi |
| 2015/0332994 | A1 | 11/2015 | Mallik et al. |
| 2015/0349960 | A1 | 12/2015 | Bagley |
| 2015/0358251 | A1 | 12/2015 | Varga et al. |
| 2015/0363358 | A1 | 12/2015 | Ronagh et al. |
| 2015/0363708 | A1 | 12/2015 | Amin et al. |
| 2016/0026183 | A1 | 1/2016 | Williams et al. |
| 2016/0071021 | A1 | 3/2016 | Raymond |
| 2016/0132785 | A1 | 5/2016 | Amin et al. |
| 2016/0162798 | A1 | 6/2016 | Marandi et al. |
| 2016/0171368 | A1 | 6/2016 | Aspuru-Guzik et al. |
| 2016/0224515 | A1 | 8/2016 | Ronagh et al. |
| 2016/0321559 | A1 | 11/2016 | Rose et al. |

(56) References Cited

U.S. PATENT DOCUMENTS

| | | |
|---|---|---|
| 2016/0328253 A1 | 11/2016 | Majumdar |
| 2016/0328659 A1 | 11/2016 | Mohseni et al. |
| 2016/0338075 A1 | 11/2016 | McKibben |
| 2016/0342891 A1 | 11/2016 | Ross et al. |
| 2017/0011305 A1 | 1/2017 | Williams |
| 2017/0017894 A1 | 1/2017 | Lanting et al. |
| 2017/0060642 A1 | 3/2017 | Castellano et al. |
| 2017/0109605 A1 | 4/2017 | Ahn |
| 2017/0147303 A1 | 5/2017 | Amy et al. |
| 2017/0147695 A1 | 5/2017 | Shih |
| 2017/0214701 A1 | 7/2017 | Hasan |
| 2017/0223143 A1 | 8/2017 | Johnson et al. |
| 2017/0242824 A1 | 8/2017 | Karimi et al. |
| 2017/0255592 A1 | 9/2017 | Karimi et al. |
| 2017/0255629 A1 | 9/2017 | Thom et al. |
| 2017/0255872 A1 | 9/2017 | Hamze et al. |
| 2017/0286852 A1 | 10/2017 | Rezaie et al. |
| 2017/0286858 A1 | 10/2017 | La Cour et al. |
| 2017/0300808 A1 | 10/2017 | Ronagh et al. |
| 2017/0323195 A1 | 11/2017 | Crawford et al. |
| 2017/0344898 A1 | 11/2017 | Karimi et al. |
| 2017/0351974 A1 | 12/2017 | Rose et al. |
| 2017/0372427 A1 | 12/2017 | Johnson et al. |
| 2017/0373940 A1 | 12/2017 | Shahab et al. |
| 2018/0014970 A1 | 1/2018 | Conde De Paiva et al. |
| 2018/0039903 A1 | 2/2018 | Mosca et al. |
| 2018/0091440 A1 | 3/2018 | Dadashikelayeh et al. |
| 2018/0096085 A1 | 4/2018 | Rubin |
| 2018/0107526 A1 | 4/2018 | Dadashikelayeh et al. |
| 2018/0114138 A1 | 4/2018 | Monroe et al. |
| 2018/0204126 A1 | 7/2018 | Galle |
| 2018/0218279 A1 | 8/2018 | Lechner et al. |
| 2018/0218281 A1 | 8/2018 | Reinhardt et al. |
| 2018/0246851 A1 | 8/2018 | Zaribafiyan et al. |
| 2018/0260730 A1 | 9/2018 | Reagor et al. |
| 2018/0267937 A1 | 9/2018 | Pelc et al. |
| 2018/0308000 A1 | 10/2018 | Dukatz et al. |
| 2018/0308007 A1 | 10/2018 | Amin et al. |
| 2018/0314970 A1 | 11/2018 | Harris et al. |
| 2019/0009581 A1 | 1/2019 | Schalk et al. |
| 2019/0095811 A1 | 3/2019 | Antonio et al. |
| 2019/0153701 A1* | 5/2019 | Gates .................. G05D 1/0287 |
| 2019/0205790 A1 | 7/2019 | Dukatz et al. |
| 2019/0251213 A1 | 8/2019 | Bishop et al. |
| 2019/0370680 A1 | 12/2019 | Novotny |
| 2019/0378047 A1 | 12/2019 | Pistoia et al. |
| 2020/0005186 A1 | 1/2020 | Romero et al. |
| 2020/0057957 A1 | 2/2020 | Johnson et al. |
| 2020/0090072 A1 | 3/2020 | Troyer et al. |
| 2020/0104740 A1 | 4/2020 | Cao |
| 2020/0125568 A1 | 4/2020 | Idicula et al. |
| 2020/0143910 A1* | 5/2020 | Noori ...................... G06F 17/15 |
| 2020/0191943 A1 | 6/2020 | Wu et al. |
| 2020/0272684 A1 | 8/2020 | Karimi et al. |
| 2020/0279187 A1 | 9/2020 | Huang et al. |
| 2020/0364597 A1 | 11/2020 | Friedlander et al. |
| 2020/0394537 A1 | 12/2020 | Wang et al. |
| 2020/0401650 A1* | 12/2020 | Chen ...................... G06F 17/16 |
| 2020/0401920 A1 | 12/2020 | Killoran et al. |
| 2020/0410343 A1 | 12/2020 | Niu et al. |
| 2021/0042090 A1* | 2/2021 | Patel ...................... G06Q 10/10 |
| 2021/0103847 A1 | 4/2021 | Akzam |
| 2021/0125094 A1 | 4/2021 | Chamberland et al. |
| 2021/0166133 A1 | 6/2021 | Ronagh et al. |
| 2021/0166148 A1 | 6/2021 | Matsuura et al. |
| 2021/0279260 A1 | 9/2021 | Oberoi et al. |
| 2021/0287124 A1 | 9/2021 | Ronagh et al. |
| 2021/0289020 A1 | 9/2021 | Rolfe et al. |
| 2021/0303704 A1* | 9/2021 | Chen ...................... G06N 5/01 |
| 2021/0304052 A1 | 9/2021 | Pant |
| 2021/0374611 A1 | 12/2021 | Ronagh et al. |
| 2022/0101172 A1 | 3/2022 | Lee et al. |
| 2022/0107927 A1 | 4/2022 | Vedaie et al. |
| 2023/0104058 A1 | 4/2023 | Hopfmueller et al. |
| 2023/0222173 A1 | 7/2023 | Ronagh et al. |
| 2023/0259385 A1 | 8/2023 | Rosenberg et al. |
| 2023/0334115 A1 | 10/2023 | Yildiz et al. |

FOREIGN PATENT DOCUMENTS

| | | |
|---|---|---|
| CA | 2902015 A1 | 1/2016 |
| CA | 2921711 A1 | 8/2017 |
| CA | 3026824 A1 | 12/2017 |
| CN | 106874506 A | 6/2017 |
| CN | 110069348 A | 7/2019 |
| CN | 112034842 A | 12/2020 |
| EP | 3113084 A1 | 1/2017 |
| JP | 2004503011 A | 1/2004 |
| JP | 2006061926 A | 3/2006 |
| JP | 2008525873 A | 7/2008 |
| JP | 2013114366 A | 6/2013 |
| JP | 2016206795 A | 12/2016 |
| WO | WO-2005122052 A1 | 12/2005 |
| WO | WO-2006026985 A2 | 3/2006 |
| WO | WO-2007089674 A2 | 8/2007 |
| WO | WO-2007147243 A1 | 12/2007 |
| WO | WO-2010148120 A2 | 12/2010 |
| WO | WO-2013006836 A1 | 1/2013 |
| WO | WO-2014210368 A1 | 12/2014 |
| WO | WO-2015006494 A1 | 1/2015 |
| WO | WO-2015060915 A2 | 4/2015 |
| WO | WO-2015121619 A2 | 8/2015 |
| WO | WO-2016029172 A1 | 2/2016 |
| WO | WO-2017033326 A1 | 3/2017 |
| WO | WO-2017068228 A1 | 4/2017 |
| WO | WO-2017111937 A1 | 6/2017 |
| WO | WO-2017145086 A1 | 8/2017 |
| WO | WO-2017149491 A1 | 9/2017 |
| WO | WO-2017152289 A1 | 9/2017 |
| WO | WO-2017168865 A1 | 10/2017 |
| WO | WO-2017201626 A1 | 11/2017 |
| WO | WO-2017214717 A1 | 12/2017 |
| WO | WO-2018058061 A1 | 3/2018 |
| WO | WO-2018119522 A1 | 7/2018 |
| WO | WO-2018160599 A1 | 9/2018 |
| WO | WO-2019104440 A1 | 6/2019 |
| WO | WO-2019104443 A1 | 6/2019 |
| WO | WO-2019152020 A1 | 8/2019 |
| WO | WO-2019157228 A1 | 8/2019 |
| WO | WO-2019222748 A1 | 11/2019 |
| WO | WO-2019241879 A1 | 12/2019 |
| WO | WO-2019244105 A1 | 12/2019 |
| WO | WO-2020113339 A1 | 6/2020 |
| WO | WO-2020223718 A1 | 11/2020 |
| WO | WO-2020227825 A1 | 11/2020 |
| WO | WO-2020255076 A1 | 12/2020 |
| WO | WO-2021055000 A1 | 3/2021 |
| WO | WO-2021111368 A1 | 6/2021 |
| WO | WO-2021181281 A1 | 9/2021 |
| WO | WO-2021207847 A1 | 10/2021 |
| WO | WO-2021237350 A1 | 12/2021 |
| WO | WO-2021243454 A1 | 12/2021 |
| WO | WO-2022079640 A1 | 4/2022 |
| WO | WO-2022123494 A1 | 6/2022 |
| WO | WO-2022224143 A1 | 10/2022 |
| WO | WO-2023275825 A1 | 1/2023 |
| WO | WO-2023053035 A1 | 4/2023 |
| WO | WO-2023242744 A1 | 12/2023 |

OTHER PUBLICATIONS

Aharonov, et al. Adiabatic quantum state generation and statistical zero knowledge. Proceedings of the thirty-fifth annual ACM symposium on Theory of computing. 2003. https://arxiv.org/abs/quant-ph/0301023.

Akama et al. Implementation of divide-and-conquer method including Hartree-Fock exchange interaction. J Comput Chem 28(12):2003-2012 (2007).

Alidaee et al. Solving the maximum edge weight clique problem via unconstrained quadratic programming. European Journal of Operational Research 181(2):592-597 (2007).

(56) References Cited

OTHER PUBLICATIONS

Amelio et al.: Community mining in signed networks: A multiobjective approach. ASONAM 2013: Proceedings of the 2013 IEEE/ACM International Conference on Advances in Social Networks Analysis and Mining, pp. 95-99 https://doi.org/10.1145/2492517.2492641 (2013).
Amin et al.: Quantum Boltzmann Machine. arXiv reprint arXiv:1601.02036 [1-10] 2016.
An et al., "Quantum linear system solver based on time-optimal adiabatic quantum computing and quantum approximate optimization algorithm," 2019, arXiv preprint arXiv:1909.05500.
Anchuri et al.: Communities and balance in signed networks: A spectral approach. In Proceedings of the 2012 International Conference on Advances in Social Networks Analysis and Mining (ASONAM 2012), ASONAM 2012, pp. 235-242, Washington, DC, USA (2012).
Anthony et al. Quadratization of symmetric pseudo-Boolean functions. Discrete Appl. Math. 203:1-12 (2016).
Aspuru-Guzik et al. Simulated Quantum Computation of Molecular Energies. Science 309:1704 (2005).
Assad et al. The quadratic minimum spanning tree problem. Naval Research Logistics 39:399-417 (1992).
Babbush et al. Resource Efficient Gadgets for Compiling Adiabatic Quantum Optimization Problems. arXiv:1307.8041v1 [quant-ph] (pp. 1-11) (Jul. 2013) Retrieved from the Internet: (https://arxiv.org/pdf/1307.8041.pdf5).
Babbush. Towards Viable Quantum Computation for Chemistry, 2015, [Retrieved on Feb. 27, 2020]. Retrieved from the internet: <url: https://pdfs.sennanticscholar.org/aff0/5ecf5f58c2206c923b767d76bed7f43b2a66.pdf? ga=2.2412147.276222377.1582743768639821531.1551220934 376 Pages (1376) (2015).
Barends et al. Digitized adiabatic quantum computing with a superconducting circuit. Nature 534(7606):222-226 (2016).
Bartak et al. Constraint Satisfaction Techniques for Planning and Scheduling Problems (Coplas-15), Jul. 6, 2015. Retrieved on Nov. 17, 2019 at https://www.cs.bgu.ac.il/-icapsl5/workshops/Proceedings%2000PLAS%202015.pdf (pp. 1-41) (2015).
Beasley. Integer programming solution methods. Available at URL: http://people.brunel.ac.uk/-mastjb/jeb/natcor_ip_rest.pdf (20 pgs.) (2011).
Berry et al. Simulating Hamiltonian dynamics with a truncated Taylor series. Phys Rev Lett 114(9):090502 (2015).
Bertoni et al. Quantum logic gates based on coherent electron transport in quantum wires. Physical Review Letters 84(25):5912 (2000).
Bhagat et al.: Node Classification in Social Networks. arXiv:1101.3291v1 Social Network Data Analytics, pp. 115-148 (2011).
Bian et al. The Ising model: teaching an old problem new tricks. D-Wave Systems 2 (32 pgs.) (2010).
Boixo, et al., "Fast quantum algorithms for traversing paths of eigenstates," 2010, arXiv preprint arXiv:1005.3034, 36 pgs.
Boixo et al., "Quantum state preparation by phase randomization," 2009, arXiv preprint arXiv:0903.1652.
Bojchevski et al.: Deep Gaussian Embedding of Graphs: Unsupervised Inductive Learning via Ranking. arXiv.org, Cornell University, arXiv:1707.03815v4 [stat.ML], pp. 1-13 (2018).
Bombin, et al. Topological quantum distillation. Phys Rev Lett. Nov. 3, 2006;97(18):180501. doi: 10.1103/PhysRevLett.97.180501. Epub Oct. 30, 2006.
Boros et al. On quadratization of pseudo-Boolean functions. arXiv:1404.6538v1 [math.OC] (11 pgs.) (2014).
Boros et al. Pseudo-boolean optimization. Discrete Applied Mathematics 123(1):155-225 (2002).
Brassard, et al., "An exact quantum polynomial-time algorithm for Simon's problem," Proceedings of the Fifth Israeli Symposium on Theory of Computing and Systems, IEEE, 1997; 12 pgs.
Bravyi et al. Fermionic quantum computation. arXiv:quant-ph/0003137 (2000).
Bromley et al.: Applications of near-term photonic quantum computers: software and algorithms. Quantum Science and Technology 5:034010DOI:10.1088/2058-9565/ab8504 arXiv:1912.07634 [1-36] (2019).
Burell: An Introduction to Quantum Computing using Cavity QED concepts. arXiv preprint arXiv:1210.6512 (2012).
Butenko, S., Maximum Independent Set and Related Problems, With Applications, A Dissertation Presented to the Graduate School of the University of Florida in Partial Fulfillment of the Requirements for the Degree of Doctor of Philosophy University of Florida, 167 pages (2003).
Byrnes et al. Macroscopic quantum computation using Bose-Einstein condensates. arXiv preprint quantum-ph/1103.5512 (2011).
Cai et al. A practical heuristic for finding graph minors.arXiv:1406.2741 [quant-ph] (16 pgs) (2014).
Cai et al.: A survey on network community detection based on evolutionary computation. International Journal of Bio-Inspired Computation 8(2):84-98 (2016).
Cao et al.: Advances in Knowledge Discovery and Data Mining. Springer International, pp. 82-95 (2015).
Carleo et al.: Constructing exact representations of quantum many-body systems with deep neural networks. Nat Commun. 9(1):5322, pp. 1-11 doi:10.1038/s41467-018-07520-3 (2018).
Carleo et al.: Solving the quantum many-body problem with artificial neural networks. pre-print arXiv:1606.02318 Science 355(6325):602-606 doi:10.1126/science.aag2302 (2016).
Carrasquilla et al.: Reconstructing quantum states with generative models. arXiv:1810.10584 Nature Machine Intelligence 1(3):155-161 arXiv:1810.10584 (2019).
Carrasquilla. Machine learning for quantum matter. https://arxiv.org/pdf/2003.11040.pdf (2020).
Chamberland et al., Triangular color codes on trivalent graphs with flag qubits. New J. Phys. Feb. 2020. vol. 22 023019. 24 pages. https://doi.org/10.1088/1367-2630/ab68fd.
Chen et al.: Community Detection via Maximization of Modularity and its Variants. IEEE Transactions on Computational Social Systems 1(1):46-65 DOI:10.1109/TCSS.2014.2307458 (2014).
Chen et al.: Epidemic spreading on networks with overlapping community structure. Physica A: Statistical Mechanics and its Applications 391(4):1848-1854 (2012).
Chiang et al.: Exploiting longer cycles for link prediction in signed networks. In Proceedings of the 20th ACM International Conference on Information and Knowledge Management, CIKM 2011, pp. 1157-1162, New York, NY, USA [1-6] (2011).
Choi. Minor-embedding in adiabatic quantum computation: I. The parameter setting problem. Quantum Information Processing 7(5):193-209 (2008).
Chowdhury et al.: Quantum algorithms for Gibbs sampling and hitting-time estimation. arXiv:1603.02940 Quant. Inf. Comp. 17(1-2):41-64 (2017).
Chuang et al.: Experimental implementation of fast quantum searching. Physical Review Letters 80(15):3408-3411 DOI:10.1103/PhysRevLett.80.3408 (1998).
Clarke et al. Superconducting quantum bits. Nature 453(7198):1031 (2008).
Conforti et al.: Integer Programming: Graduate Texts in Mathematics 271. Springer [1-466] (2014).
Conway et al. An FPGA-based instrumentation platform for use at deep cryogenic temperatures. arxiv.org/abs/1509.06809 (2015).
Co-pending U.S. Appl. No. 18/189,390, inventors Dadashikelayeh; Majid et al., filed Mar. 24, 2023.
Cory et al. Nuclear magnetic resonance spectroscopy: An experimentally accessible paradigm for quantum computing. arXiv preprint quant-ph/97090 01(1997).
Cowtan et al. On the qubit routing problem. arXiv:1902.08091v2 (2019).
Cramer et al. Efficient quantum state tomography, Nature Communications 1:149 (2010).
Das et al, A Scalable Decoder Micro-architecture for Fault-Tolerant Quantum Computing. arXiv preprint arXiv:2001.06598 (2020).
Debnath et al.: Demonstration of a small programmable quantum computer with atomic qubits. arXiv:1603.04512 Nature 536(7614):63-66 doi:10.1038/nature18648 (2016).

(56) References Cited

OTHER PUBLICATIONS

Delfosse et al, Almost-linear time decoding algorithm for topological codes. Quantum 5 (2021): 595.

Delfosse et al, Toward a Union-Find decoder for quantum LDPC codes. IEEE Transactions on Information Theory 68.5 (2022): 3187-3199.

Deutsch et al. Quantum computing with neutral atoms in an optical lattice. arXiv preprint quant-ph/0003022 Fortschritte der Physik Progress of Physics; Oct. 2000, vol. 48, No. 9-11, pp. 925-943 (2000).

Durr et al. A Quantum Algorithm for Finding the Minimum. arXiv:quant-ph/9607014 (1996).

Dwave, Reverse Quantum Annealing for Local Refinement of Solutions, D-Wave Whitepaper Series, Nov. 9, 2017. Retrieved online on Aug. 14, 2019 from https://www.dwavesys.com/sites/default/files/14-1018A-A_Reverse_Quantum_Annealing_for_Local_Refinement_Of_Solutions.pdf (2 pgs.).

Eidenbenz et al. Quantum Algorithm Implementations for Beginners. https://arxiv.org/abs/1804.03719, arXiv:1804.03719v1 [cs.ET ], Apr. 10, 2018, pp. 1-75) (Year: 2018).

Elvira et al.: Efficient Multiple Importance Sampling Estimators. pre-print arxiv.org/pdf/1505.05391, pp. 1-7 (2015).

EP17812349.3 Third Party Observations dated Oct. 29, 2020.

Esmailian et al.: Mesoscopic analysis of online social networks: The role of negative ties. arXiv:1411.6057v1 Phys. Rev. E90:042817, pp. 1-13 (2014).

Fan, et al. Robust Optimization of Graph Partitioning and Critical Node Detection in Analyzing Networks. In Combinatorial Optimization and Applications—4th International Conference, COCOA 2010, Proceedings (Part 1 ed., pp. 170-183). (Year: 2010).

Fan, et al. Robust optimization of graph partitioning involving interval uncertainty. Theoretical Computer Science. 447 (2012): 53-61.

Farhi et al. A Quantum Approximate Optimization Algorithm. arXiv:1411.4028 (2014).

Farhi, et al. Quantum Adiabatic Evolution Algorithms versus Simulated Annealing. arXiv.org:quant-ph/0201031 pp. 1-16 (2002).

Farhi et al. Quantum computation by adiabatic evolution. arXiv preprint quant-ph/0001106 (24 pgs) (2000).

Fedichkin et al. Novel coherent quantum bit using spatial quantization levels in semiconductor quantum dot. arXiv preprint quant-ph/0006097 (2000).

Fedorov et al. Exploring chemistry with the fragment molecular orbital method. Physical Chemistry Chemical Physics 14:7562-7577 (2012).

Ferrara et al.: Detecting criminal organizations in mobile phone networks. arXiv:1404.1295v1 Expert Systems with Applications 41(13):5733-5750 (2014).

Fortunato: Community detection in graphs. arXiv.org, Cornell University, arXiv:0906.0612v1 [physics.soc-ph], pp. 1-89 (2009).

Fowler, A.G. Minimum weight perfect matching in O (1) parallel time. arXiv 1307 (2013).

Freund. Applied Lagrange Duality for Constrained Optimization. Massachusetts Institute of Technology (pp. 1-35) (2004).

Gelman et al.: Simulating normalizing constants: from importance sampling to bridge sampling to path sampling. Statist. Sci. 13(2):163-185 DOI:10.1214/ss/1028905934 (1998).

Geoffrion. Lagrangean relaxation for integer programming. Mathematics Programming Study 2, North-Holland Publishing Company (pp. 1-34) (1974).

Gheorghiu, V. Standard form of qudit stabilizer groups. arXiv preprint arXiv:1101.1519 (2011).

Gibbons, L.E et al., Continuous Characterizations of the Maximum Clique Problem, DIMACS Technical Report 96-09, Center for Applied Optimization Dept of Industrial and Systems Engineering University of Florida, Gainesville, FL 32611, 19 pages (Apr. 1996).

Gibbons, L.E. et al., Continuous Characterizations of the Maximum Clique Problem, Mathematics of Operational Research 22(3):754-768 (Aug. 1997).

Glover et al. Polynomial unconstrained binary optimisation Part 1, 2011, [Retrieved on Feb. 27, 2020]. Retrieved from the internet: <url: http://leedsfaculty.colorado.edu/glover/fred%20pubs/424%20%20%20Polynonnial 25 Pages (231256) (2011).

Glover et al. Tabu Search. Handbook of Combinatorial Optimization, Du DZ., Pardalos P.M. (eds), Springer, Boston, MA, 1998; 94 pgs.

Glover et al.: Tabu Search: Modern Heuristic Techniques for Combinatorial Problems. Colin R. Reeves (Ed.) Black Scientific Publications, Oxford [1-62] (1993).

Glover: Tabu search—part II. ORSA Journal on computing 2(1):4-32.1 4-32 DOI:10.1287/ijoc.2.1.4 (1990).

Gottesman, D. An Introduction to Quantum Error Correction and Fault-Tolerant Quantum Computation. arXiv preprint arXiv:0904.2557 (2009).

Greene et al. Simulated annealing without rejected moves. IEEE Transactions on Computer-Aided Design of Integrated Circuits and Systems 5(1):221-228 (1986).

Grover. A fast quantum mechanical algorithm for database search. Proceedings of the 28th Annual ACM Symposium on the Theory of Computing (pp. 212-219) (1996).

Gwennap: Groq Rocks Neural Networks. The Linley Group Microprocessor Report www.groq.com/groq-tsp-leads-in-inference-performance/ [1-5] (2020).

Hamilton et al.: Representation Learning on Graphs: Methods and Applications. arXiv.org, Cornell University, arXiv:1709.05584v3 [cs.SI], pp. 1-24 (2018).

Han et al., "Approximate computing: An emerging paradigm for energy-efficient design," 18th IEEE European Test Symposium (ETS), IEEE, 2013; https://ieeexplore.ieee.org/document/6569370.

Harneit. Spin Quantum Computing with Endohedral Fullerenes. arXiv preprint arXiv:1708.092 98 (2017).

He et al.: MISAGA: An Algorithm for Mining Interesting Subgraphs in Attributed Graphs. IEEE Transactions on Cybernetics 48(5):1369-1382 (2018).

Heider: Attitudes and cognitive organization. The Journal of Psychology 21(1):107-112 (1946).

Hennessy, et al. Computer Architecture: A Quantitative Approach. Elsevier Science & Technology, 2014. ProQuest Ebook Central, https://ebookcentral.proquest.com/lib/uspto-ebooks/detail.action?docID=404052. (Year: 2014).

Huang et al, Fault-tolerant weighted union-find decoding on the toric code. Physical Review A 102.1 (2020): 012419.

Huang et al.: Predicting many properties of a quantum system from very few measurements. Nature Physics 16(10)1050-1057 doi:arxiv.org/abs/2002.08953 [1-40](2020).

Hukushima et al. Exchange Monte Carlo Method and Application to Spin Glass Simulations. Journal of the Physical Society of Japan 65:1604 (1996).

Humble et al.: Software Systems for High-performance Quantum Computing. IEEE Xplore doi:10.1109/HPEC.2016.7761628 [1-8](2016).

Imamoglu, et al. Quantum information processing using quantum dot spins and cavity-QED. arXiv preprint quant-ph/9904096 (1999).

Inagaki, T., Combinatorial optimization using optical oscillator networks, J-Stage 33(5):586-591 (2018).

Ishikawa. Transformation of General Binary MRF Minimization to the First-Order Case. IEEE Transactions on Pattern Analysis and Machine Intelligence. 33(6):1234-1249 (2011).

Izmaylov et al.: Revising the measurement process in the variational quantum eigensolver: is it possible to reduce the number of separately measured operators? Chem Sci. 10(13):3746-3755 (2019).

Jiang, et al. Simulated annealing based influence maximization in social networks. Twenty-fifth AAAI conference on artificial intelligence (AAAI'11). AAAI Press, 127-132. (Year: 2011).

Johnson et al. Quantum annealing with manufactured spins. Nature 473(7346):194-198 (2011).

Jones et al.: Implementation of a quantum algorithm to solve Deutsch's problem on a nuclear magnetic resonance quantum computer. arXiv:quant-ph/9801027v2 The Journal of chemical physics, 109(5):1648-1653 DOI:10.1063/1.476739 (1998).

Jordan. Fast Quantum Algorithm for Numerical Gradient Estimation. Physical Review Letters 95:050501 (2015).

(56) References Cited

OTHER PUBLICATIONS

Kako, S. et al., Coherent Ising Machines with Error Correction Feedback, Advanced Quantum Technologies 3(2000045):14 pages (2020).
Kaminsky et al.: Scalable architecture for adiabatic quantum computing of NP-hard problems. Quantum Computing & Quantum Bits in Mesoscopic Systems, pp. 229-236 DOI:10.1007/978-1-4419-9092-1_25 [arXiv:quant-ph/0211152 1-10] (2004).
Kane. A silicon-based nuclear spin quantum computer. Nature 393(6681):133 (1998).
Karimi et al. A subgradient approach for constrained binary programming via quantum adiabatic evolution. arXiv preprint arXiv:1605.09462 (16 pgs.) (2016).
Karimi et al. Boosting quantum annealer performance via quantum persistence. Online publication eprint arXiv:1606.07797 (Jun. 27, 2027 and updated Aug. 30, 2016). Accessed May 17, 2017 and available from https://www.arxiv.org/pdf/1606.07797.pdf (25 pgs).
Karimi, et al. Practical integer-to-binary mapping for quantum annealers. Quantum Information Processing, vol. 18, No. 4, 94 (2019) DOI: 10.1007/s11128-019-2213-x.
Kassal et al.: Simulating chemistry using quantum computers. Annu Rev Phys Chem. 62:185-207 (2011).
Katzgraber et al. Seeking quantum speedup through spin glasses: the good, the bad, and the ugly. Physical Review 5(3):031026 (2015).
Kellerer et al. Knapsack Problems. Springer (15 pgs.) (2004).
Kempe et al.: The Complexity of the Local Hamiltonian Problem. SIAM Journal of Computing. 35(5):1070-1097 Rev.2008 DOI: arXiv:quant-ph/0406180v2 [1-30] (2005).
Kielpinski et al. Architecture for a large-scale ion-trap quantum computer. Nature 417(6890):709 (2002).
Kirkpatrick et al. Optimization by simulated annealing. Science 220:671-680 (1983).
Kitaura et al. Fragment molecular orbital method: an approximate computational method for large molecules. Chemical Physics Letters 313(3-4):701-706 (1999).
Knill et al. Efficient linear optics quantum computation. arXiv preprint quant-ph/0006088 (2000).
Knill, et al. Resilient Quantum Computation: Error Models and Thresholds. Proceedings of the Royal Society of London. Series A: Mathematical, Physical and Engineering Sciences 454.1969 (1998): 365-384.
Knizia et al. Density Matrix Embedding: A Simple Alternative to Dynamical Mean-Field Theory. Phys Rev Lett 109:186404 (2012).
Kobayashi et al. Chapter 5: Divide-and-conquer approaches to quantum chemistry: Theory and implementation, in Linear-Scaling Techniques in Computational Chemistry and Physics: Methods and Applications, edited by Zalesny et al. (Springer Netherlands, Dordrecht, 2011) pp. 97-127.
Kochenberger et al.: The unconstrained binary quadratic programming problem: A survey. J Comb Optim. 28(1)58-81 DOI:10.1007/s10878-014-9734-0 (2014).
Kokail et al. Self-verifying variational quantum simulation of lattice models. Nature 569(7756):355-360 (2019).
Konda et al. Actor-Critic Algorithms. Advances in Neural Information Processing Systems. pp. 1008-1014 (2000).
Krol et al., "Efficient decomposition of unitary matrices in quantum circuit compilers," 2021, arXiv preprint arXiv:2101.02993, 13 pgs.
Kubica et al., Efficient color code decoders in d = 2 dimensions from toric code decoders. arXiv preprint arXiv:1905.07393 (2019).
Kunegis et al.: The slashdot zoo: Mining a social network with negative edges. In Proceedings of the 18th International 20 Conference on World Wide Web, WWW 2009, pp. 741-750, New York, NY, USA DOI: 10.1145/1526709.1526809 (2009).
Lamb, I.D.C. et al., An FPGA-based Instrumentation Platform for use at Deep Cryogenic Temperatures, arXiv:1509.06809 [physics.ins-det]: 1-8 (2015).
Lavnikevich, N., (1, k)-Swap Local Search for Maximum Clique Problem, arXiv:1704.00908 [math.OC], 14 pages, submitted on Apr. 4, 2017, abstract, 3 pages.

Lemieux et al.: Efficient Quantum Walk Circuits for Metropolis-Hastings Algorithm. Quantum 4:287 [1-15] (2020).
Lemieux et al.: Resource estimate for quantum many-body ground-state preparation on a quantum computer. Physical Review A 103(5)052408 DOI:10.1103/PhysRevA. 103.052408 [1-9] (2021).
Lenstra: Integer programming with a fixed number of variables. 8(4):538-548 URL:https://doi.org/10.1287/moor.8.4.538 (1983).
Leskovec et al.: Empirical Comparison of Algorithms for Network Community Detection. Proceedings of International World Wide Web Conference 2010, Raleigh, North Carolina, USA, pp. 1-10 (2010).
Leskovec et al.: Predicting positive and negative links in online social networks. In Proceedings of the 19th International Conference on World Wide Web, WWW 2010, pp. 1-10, New York, NY, USA (2010).
Leuenberger et al. Quantum computing in molecular magnets. arXiv preprint cond-mat/0011415 (2001).
Levit et al. Free energy-based reinforcement learning using a quantum processor. Available at https://arxiv.org/pdf/1706.00074.pdf (May 2017) (8 pgs.).
Leyffer. Deterministic Methods for Mixed Integer Nonlinear Programming. University of Dundee (pp. 1-60 and pp. 1-58) (1993).
Li et al. Nonlinear Integer Programming. New York, NY (pp. 1-452) (2006).
Li: Tackling the Qubit Mapping Problem for NISQ-Era Quantum Devices. arXiv:1809.02573v2 Proceedings of the Twenty-Fourth International Conference on Architectural Support for Programming Languages and Operating Systems. (2019).
Liben-Nowell et al.: The link prediction problem for social networks. In Proceedings of the Twelfth International Conference on Information and Knowledge Management, CIKM 2003, pp. 556-559, New York, NY, USA [1-19](2004).
Lin et al.: Understanding community effects on information diffusion. Advances in Knowledge Discovery and Data Mining, pp. 82-95 DOI:10.1007/978-3-319-18038-0_7 (2015).
Low et al.: Hamiltonian simulation by Qubitization. arXiv:1610.06546v3 Quantum 3:163 URL:https://doi.org/10.22331/q-2019-07-12-163 [1-23] (2019).
Lu et al.: Demonstration of Shor's quantum factoring algorithm using photonic qubits. arXiv:0705.1684v3 Physical Review Letters 99(25):250504 DOI:10.1103/PhysRevLett.99.250504 [1-5] (2007).
Lu et al.: KKT Solution and Conic Relaxation for Solving Quadratically Constrained Quadratic Programming Problem. SIAM J. Optim. 21(4):1475-1490 DOI:10.1137/100793955 (2011).
Lu et al., Quantum chemistry simulation on quantum computers: theories and experiments. Physical Chemistry Chemical Physics 14(26):9411-9420 (2012).
Lyon. Spin-based quantum computing using electrons on liquid helium. arXiv preprint cond-mat/030158 1 (2006).
Mao, et al. Artificial neural networks for feature extraction and multivariate data projection. IEEE Transactions on Neural Networks. vol. 6, No. 2, pp. 296-317, Mar. 1995, doi: 10.1109/72.363467.
Martinis et al. Rabi oscillations in a large Josephson-junction qubit. Physical Review Letters 89:117901 (2002).
Marx et al. Chapter 1. Setting the stage: why ab initio molecular dynamics? In Ab Initio Molecular Dynamics: Basic Theory and Advanced Methods. Cambridge, UK Cambridge University Press (pp. 1-8) (2009).
Massa et al.: Controversial users demand local trust metrics: An experimental study on Epinions.com community. In Proceedings of the 20th National Conference on Artificial Intelligence AAA Press vol. 1, AAAI-05:121-126 (2005).
Matsubara, et al. Ising-Model Optimizer with Parallel-Trial Bit-Sieve Engine. Complex, Intelligent, and Software Intensive Systems: Proceedings of the 11th International Conference on Complex, Intelligent, and Software Intensive Systems (CISIS-2017), pp. 432-438, 2018.
Matsuura et al. VanQver: The Variational and Adiabatically Navigated Quantum Eigensolver. New Journal of Physics 22:053023 (2020).

(56) References Cited

OTHER PUBLICATIONS

McCaskey, et al. Hybrid Programming for Near-term Quantum Computing Systems. 2018 IEEE international conference on rebooting computing (ICRC). 2018. pp. 1-12.
McClean et al. The Theory of Variational Hybrid Quantum-Classical Algorithms, Institute of Physics. New Journal of Physics 18:023023. Retrieved online on Aug. 14, 2019 from https://iopscience.iop.org/article/10.1088/1367-2630/18/2/023023/ampdf (21 pgs) (2016).
McGeoch et al. Experimental Evaluation of an Adiabatic Quantum System for Combinatorial Optimization. Computing Frontiers. Proceeding CF '13 Proceedings of the ACM International Conference on Computing Frontiers. Article No. 23. Available at http://www.cs.amherst.edu/ccm/cf14-mcgeoch.pdf (11 pgs) (May 14-16, 2013).
McKiernan et al. Automated quantum programming via reinforcement learning for combinatorial optimization. Quantum Physics. arXiv.org quant-ph arXiv:1908.08054 (2019).
Medus et al.: Detection of community structures in networks via global optimization. Physica A: Statistical Mechanics and its Applications 358(2-4):593-604 DOI:10.1016/j.physa.2005.04.022 (2005).
Melko et al.: Restricted Boltzmann machines in quantum physics. Nature Physics 15(9):887-892 DOI:10.1038/s41567-019-0545-1 (2019).
Membrives, E.J. Machine-Learning for Optimization of Software Parameters. Technical Disclosure Commons. Defensive Publication Series. Dec. 7, 2017. pp. 1-35. https://www.tdcommons.org/dpubs_series/898.
Metz. IBM is Now Letting Anyone Play With Its Quantum Computer. Wired. (5 pgs.) (May 2016).
Mnih et al. Asynchronous Methods for Deep Reinforcement Learning, in International Conference on Machine Learning, pp. 1928-1937 (2016).
Mnih et al. Playing Atari with Deep Reinforcement Learning. arXiv:1312.5602 (2013).
Moll et al., Optimizing qubit resources for quantum chemistry simulations in second quantization on quantum computer. Journal of Physics A: Mathematical and Theoretical 49(29):295301 (2016).
Moll et al.: Quantum optimization using variational algorithms on near-term quantum devices. Quantum Sci. Technol. 3 030503 [1-17] (2018).
Montanaro. Quantum walk speedup of backtracking algorithms. arXiv:1509.02374v2 [quant-ph] (23 pgs) (2015).
Monz et al.: Realization of a scalable Shor algorithm. arXiv:1507.08852 Science 351(6277):1068-1070 DOI:10.1126/science.aad9480 (2015).
Motzkin et al.: Maxima for graphs as a new proof of a theorem of Turan. Canadian Journal of Mathematics 17:533-540 DOI:10.4153/CJM-1965-053-6 (1965).
Nafradi et al. Room temperature manipulation of long lifetime spins in metallic-like carbon nanospheres. Nat Commun 7:12232 (2016).
Nagy et al.: Variational quantum Monte Carlo method with a neural-network ansatz for open quantum systems. Phys Rev Letters 122(25):250501 doi:arxiv.org/abs/1902.09483 [1-10](2019).
Nam et al.: Ground-state energy estimation of the water molecule on a trapped ion quantum computer. arXiv preprint arXiv:1902.10171, pp. 1-14 (2019).
Newman et al.: Finding and evaluating community structure in networks. Phys. Rev. E. 69:026113, pp. 1-16 (2004).
Newman: Modularity and community structure in networks. PNAS 103(23):8577-8582 (2006).
Nielsen, et al. Quantum Computation and Quantum Information. Chapter 10: Quantum error-correction. Cambridge University Press. pp. 425-499. (2010).
Niklasson et al., Fast method for quantum mechanical molecular dynamics. Physical Review B 86(17):174308 (2012).
Nishikawa et al. Quantum Chemistry Grid/Gaussian Portal, Journal of the twenty second Annual Research Society, Japan Simulation Society, Jun. 18, 2003, pp. 369 to 372 (English Abstract).
Nizovtsev et al. A quantum computer based on NV centers in diamond: optically detected nutations of single electron and nuclear spins. Optics and spectroscopy 99(2):233-244 (2005).
O'Gorman et al. Compiling planning into quantum optimization problems: a comparative study. Proc. of the Workshop on Constraint Satisfaction Techniques for Planning and Scheduling Problems (Coplas-15) (pp. 11-20) (Jun. 2015) Retrieved from the Internet: <https://www.cs.bgu.acilt--icaps15/workshops/Proceedings%2000PLAS%202015.pdf>.
Ohlsson et al. Quantum computer hardware based on rare-earth-ion-doped inorganic crystals. Optics Communications 201(1-3):71-77 (2002).
Olsson et al.: Solving Large Scale Binary Quadratic Problems: Spectral Methods vs. Semidefinite Programming. IEEE Conference on Computer Vision and Pattern Recognition, pp. 1-8, doi:10.1109/CVPR.2007.383202 (2007).
O'Malley et al. Scalable Quantum Simulation of Molecular Energies. Phys. Rev. X 6:031007 (2016).
Orus. Tensor networks for complex quantum systems. Nature Reviews Physics 1:538 (2019).
Papamakarios: Comparison of Modern Stochastic Optimization Algorithms. Scholar article. [1-13] (2014) www.richtarik.org/papers/Papamakarios.pdf.
Pardalos, P.M. et al., The Maximum Clique Problem, Journal of Global Optimization 4:301-328 (1994).
Parekh, et al. Benchmarking adiabatic quantum optimization for complex network analysis. arXiv preprint arXiv: 1604.00319 (2016). (Year: 2016).
PCT/CA2017/050320 International Search Report and Written Opinion dated Jun. 27, 2017.
PCT/CA2017/050637 International Search Report and Written Opinion dated Aug. 25, 2017.
PCT/CA2017/050709 International Search Report and Written Opinion dated Sep. 19, 2017.
PCT/CA2017/051610 International Search Report and Written Opinion dated Mar. 21, 2018.
PCT/CA2018/051531 International Search Report and Written Opinion dated Feb. 20, 2019.
PCT/CA2018/051534 International Search Report and Written Opinion dated Feb. 21, 2019.
PCT/CA2019/050852 International Search Report and Written Opinion dated Aug. 15, 2019.
PCT/CA2019/051752 International Search Report and Written Opinion dated Mar. 17, 2020.
PCT/CA2020/050641 International Search Report and Written Opinion dated Jul. 21, 2020.
PCT/CA2021/050513 International Search Report and Written Opinion dated Jul. 14, 2021.
PCT/CA2021/050709 International Search Report and Written Opinion dated Aug. 3, 2021.
PCT/CA2021/050750 International Search Report and Written Opinion dated Aug. 6, 2021.
PCT/IB2017/051038 International Search Report dated May 16, 2017.
PCT/IB2017/051224 International Search Report dated May 18, 2017.
PCT/IB2019/055226 International Search Report and Written Opinion dated Nov. 26, 2019.
PCT/IB2020/055801 International Search Report and Written Opinion dated Oct. 30, 2020.
PCT/IB2020/061464 International Search Report and Written Opinion dated Mar. 4, 2021.
PCT/IB2021/051965 International Search Report and Written Opinion dated May 31, 2021.
PCT/IB2021/059421 International Search Report and Written Opinion dated Dec. 20, 2021.
PCT/IB2021/061527 International Search Report and Written Opinion dated Apr. 8, 2022.
PCT/IB2022/053658 International Search Report and Written Opinion dated Jun. 27, 2022.
PCT/IB2022/056124 International Search Report and Written Opinion dated Sep. 16, 2022.
PCT/IB2022/059253 International Search Report and Written Opinion dated Jan. 27, 2023.
PCT/IB2023/054723 International Search Report and Written Opinion dated Jul. 19, 2023.

(56) References Cited

OTHER PUBLICATIONS

Pedram, et al. Layout Optimization for Quantum Circuits with Linear Nearest Neighbor Architectures. IEEE Circuits and Systems Magazine 16 (2016): 62-74.
Pedregosa, F. Hyperparameter optimization with approximate gradient. International conference on machine learning. PMLR, 2016.
Peruzzo et al. A variational eigenvalue solver on a quantum processor. arXiv:1304.3061 (2013).
Pillutla, et al. A Smoother Way to Train Structured Prediction Models. NIPS'18: Proceedings of the 32nd International Conference on Neural Information Processing Systems. Dec. 3, 2018. doi:10.48550/arxiv.1902.03228 Retrieved from the Internet: https://dl.acm.org/doi/pdf/10.5555/3327345.3327386.
Pizzuti: A multi-objective genetic algorithm for community detection in networks. IEEE International Conference on Tools with Artificial Intelligence, pp. 379-386 DOI:10.1109/ICTAI.2009.58 (2009).
Poulin et al.: Sampling from the thermal quantum Gibbs state and evaluating partition functions with a quantum computer. arXiv:0905.2199 Physical Review Letters 103(22), pp. 1-7 DOI:10.1103/PhysRevLett.103.220502 (2009).
Preskill. Quantum Computing in the NISQ era and beyond. Quantum 2:79 arXiv:1801.00862 (2018).
Quek et al.: Adaptive Quantum State Tomography with Neural Networks. arXiv.org, Cornell University, arXiv:1812.06693v1 [quant-ph], pp. 1-13 pages (2018).
Rappe, et al. UFF, a Full Periodic Table Force Field for Molecular Mechanics and Molecular Dynamics Simulations. J. Am. Chem. Soc. 1992, 114, 25, 10024-10035. https://doi.org/10.1021/ja00051a040.
Reiher et al.: Elucidating reaction mechanisms on quantum computers. PNAS USA 114(29):7555-7560 (2017).
Resende, et al. GRASP with path-relinking: Recent advances and applications. Metaheuristics: progress as real problem solvers (2005): 29-63.
Ronagh et al. Solving constrained quadratic binary problems via quantum adiabatic evolution. arXiv preprint arXiv:1509.05001 (20 pgs.) (2015).
Rosenberg et al. Building an iterative heuristic solver for a quantum annealer. Computational Optimization and Applications 65:845 (2016).
Rubin: A Hybrid Classical/Quantum Approach for Large-Scale Studies of Quantum Systems with Density Matrix Embedding Theory. Cornell University Library, Ithaca, NY arXiv doi:arxiv.org/abs/1610.06910 [1-10](2016).
Sakaguchi, et al. Boltzmann Sampling by Degenerate Optical Parametric Oscillator Network for Structure-Based Virtual Screening. Entropy. 2016; 18(10):365. https://doi.org/10.3390/e18100365.
Salathe et al.: Dynamics and control of diseases in networks with community structure. PLOS Computational Biology 6(4):e1000736, pp. 1-11 (2010).
Sarma, Abhijat, et al. Quantum Unsupervised and Supervised Learning on Superconducting Processors. ArXiv, 2019, /abs/1909.04226 (2019).
Schmidt et al. General Atomic and Molecular Electronic Structure System. Journal of Computational Chemistry 14:1347-1363 (1993).
Schollwock. The density-matrix renormalization group. Review of Modern Physics 77:259 arxiv.org:cond-mat/0409292 (2004).
Schuld et al., "Quantum machine learning in feature Hilbert spaces", Phys. Rev. Lett.; Feb. 1, 2019, vol. 122, pp. 040504-1-12.
Schulman et al. Proximal Policy Optimization Algorithms. arXiv:1707.06347 (2017).
Schwabl: Quantum Mechanics. Springer, 4th Ed. [1-425] (2007).
Sefi, et al. How to decompose arbitrary continuous-variable quantum operations. Physical review letters 107.17 (2011): 170501.
Sepehry, et al. Smooth Structured Prediction Using Quantum and Classical Gibbs Samplers. Oct. 1, 2018 (Oct. 1, 2018) Retrieved from the Internet: URL: https://arxiv.org/pdf/1809.04091v2.pdf [retrieved on Sep. 5, 2022].
Sepehry et al. Smooth Structured Prediction Using Quantum and Classical Gibbs Samplers. Available at https://1qbit.com/wp-content/uploads/2018/09/1QBit-Research-Paper-Smooth_Structured-Prediction-Using-Quantum-And_classical-Giobbs-Samplers.pdf (Accessed Feb. 20, 2018) (32 pgs).
Shapiro et al. A survey of Lagrangean techniques for discrete optimization. Operations Research Center, Massachusetts Institute of Technology, Cambridge, Massachusetts (pp. 1-18 and pp. 1-29) (May 1977).
Shen et al.: Quantum implementation of the unitary coupled cluster for simulating molecular electronic structure. Phys. Rev. A 95, 020501(R) doi:10.1103/PhysRevA.95.020501 [1-6] (2017).
Siraichi et al. Qubit Allocation. CGO 2018—International Symposium on Code Generation and Optimization, Feb. 2018, Vienna, Austria (12 pgs) (2018). pp.1-12.
Sloss et al. Evolutionary Algorithms Review, arXiv:1906.08870 (2019).
Srinivas et al.: Muiltiobjective optimization using non-dominated sorting in genetic algorithms. Evolutionary Computation 2(3):221-248 (1994).
Sun et al. A single-photon switch and transistor enabled by a solid-state quantum memory. arXiv preprint quant-ph/1805.01964 (2018).
Suzuki. Fractal decomposition of exponential operators with applications to many-body theories and Monte Carlo simulations. Physics Letters A 146(6):319-323 (1990).
Svore et al. Toward a Software Architecture for Quantum Computing Design Tools. QPL 2004, pp. 127-144, Retrieved from the Internet: URL: https://www.microsoft.com/en-us/research/wp-content/uploads/2016/02/10Svore-Cros s-Aho-Chuang-Markov.pdf.
SymPy Python. Internals of the Polynomial Manupulation Module. Available online at http://docs.sympy.org/latest/modules/polys/internals.html (Accessed Jun. 2016) (136 pgs).
Tang et al.: A Survey of Signed Network Mining in Social Media. ACM Computing Surveys 9(4):pp. 39:1 to 39:38, arXiv.org, Cornell University, arXiv:1511.07569v3 [cs.SI] (2016).
Tavares et al. New algorithms for Quadratic Unconstrained Binary Optimization (QUBO) with applications in engineering and social sciences. Rutgers University Community Repository. Dissertation-Retrieved from the Internet <URL: https://rucorelibrariessutgers.edu/rutgers-lib/25771/> on Feb. 2, 2018 (460 pgs) (May 2008).
Temme et al.: Quantum metropolis sampling. Nature 471(7336):87-90 (2011).
Terhal et al.: The problem of equilibration and the computation of correlation functions on a quantum computer. arXiv:quant-ph/9810063 Phys.Rev. A61:22301, pp. 1-35 DOI:10.1103/PhysRevA.61.022301 (2000).
The D-Wave 2X™ Quantum Computer Technology Overview (12 pgs) (2015).
The D-Wave Quantum Computer. Brochure. D-Wave Systems Inc. 2016. www.dwavesys.com.
Torlai et al.: Neural-network quantum state tomography. pre-print arXiv:1703.05334v2 Nature Physics 14:447-450 DOI:10.1038/s41567-018-0048-5 (2017).
Tran et al. A hybrid quantum-classical approach to solving scheduling problems. AAAI Publications, Ninth Annual Symposium on Combinatorial Search. pp. 98-106 (SoCS 2016).
Tran et al. Explorations of Quantum-Classical Approaches to Scheduling a MarsLander Activity Problem. The Workshops of the Thirtieth AAAI Conference on Artificial Intelligence Planning for Hybrid Systems: Technical Report WS-16-12, p. 641-649, published on Mar. 29, 2016.
Trotter. On the product of semi-groups of operators. Proceedings of the American Mathematical Society 10(4):545-551 (1959).
U.S. Appl. No. 16/811,479 Non-Final Office Action dated Aug. 30, 2021.
U.S. Appl. No. 15/014,576 Office Action dated Dec. 26, 2017.
U.S. Appl. No. 15/014,576 Office Action dated Jul. 10, 2017.
U.S. Appl. No. 15/051,271 Office Action dated Mar. 13, 2018.
U.S. Appl. No. 15/051,271 Office Action dated Nov. 24, 2017.
U.S. Appl. No. 15/165,655 1st Action Interview dated Feb. 24, 2017.
U.S. Appl. No. 15/165,655 1st Action Interview dated Oct. 25, 2016.

(56) References Cited

OTHER PUBLICATIONS

U.S. Appl. No. 15/165,655 Office Action dated Jun. 2, 2017.
U.S. Appl. No. 15/486,960 Office Action dated Jun. 22, 2017.
U.S. Appl. No. 15/830,953 Office Action dated Feb. 14, 2018.
U.S. Appl. No. 15/831,967 Office Action dated Feb. 27, 2018.
U.S. Appl. No. 15/900,643 Miscellaneous Communication re: Third Party Submission dated Dec. 14, 2018.
U.S. Appl. No. 15/900,643 Office Action dated Apr. 14, 2022.
U.S. Appl. No. 16/010,244 Miscellaneous Communication re: Third Party Submission dated Apr. 23, 2019.
U.S. Appl. No. 16/010,244 Office Action dated Dec. 2, 2019.
U.S. Appl. No. 16/010,244 Office Action dated Jun. 10, 2019.
U.S. Appl. No. 16/124,083 Miscellaneous Communication re: Third Party Submission dated Jul. 11, 2019.
U.S. Appl. No. 16/124,083 Office Action dated Jul. 18, 2019.
U.S. Appl. No. 16/124,083 Office Action dated Nov. 21, 2019.
U.S. Appl. No. 16/162,249 Miscellaneous Communication re: Third Party Submission dated May 2, 2019.
U.S. Appl. No. 16/162,249 Office Action dated Dec. 2, 2019.
U.S. Appl. No. 16/162,249 Office Action dated Jun. 12, 2019.
U.S. Appl. No. 16/671,767 Office Action dated Aug. 30, 2022.
U.S. Appl. No. 16/811,479 Office Action dated Apr. 8, 2022.
U.S. Appl. No. 16/811,479 Office Action dated Feb. 14, 2023.
U.S. Appl. No. 16/811,479 Office Action dated Sep. 22, 2022.
U.S. Appl. No. 16/888,419 Office Action dated Aug. 24, 2023.
U.S. Appl. No. 16/888,419 Office Action dated Feb. 3, 2023.
U.S. Appl. No. 16/888,446 3rd Party Submission dated Apr. 7, 2021.
U.S. Appl. No. 17/110,729 Office Action dated May 9, 2023.
U.S. Appl. No. 17/110,729 Office Action dated Sep. 29, 2023.
U.S. Appl. No. 17/254,661 Office Action dated Mar. 18, 2022.
U.S. Appl. No. 17/254,661 Office Action dated Mar. 22, 2023.
U.S. Appl. No. 17/254,661 Office Action dated Sep. 14, 2022.
U.S. Appl. No. 17/254,661 Office Action dated Sep. 18, 2023.
U.S. Appl. No. 17/553,551 Notice of Allowance dated Dec. 1, 2023.
U.S. Appl. No. 17/553,551 Office Action dated Jul. 17, 2023.
U.S. Appl. No. 18/047,882 Office Action dated Jul. 3, 2023.
U.S. Appl. No. 18/047,981 Corrected Notice of Allowance dated Aug. 18, 2023.
U.S. Appl. No. 18/047,981 Office Action dated Jan. 11, 2023.
Ushijima-Mwesigwa, et al. Graph Partitioning using Quantum Annealing on the D-Wave System. Proceedings of the Second International Workshop on Post Moores Era Supercomputing. 2017. (Year: 2017).
Van Dam et al. How powerful is adiabatic quantum computation Proceedings 42nd IEEE Symposium on Foundations of Computer Science (pp. 279-287) (Oct. 2001).
Vartiainen: Unitary Transformations for Quantum Computing. Doctoral Dissertation. Helsinki University of Technology TKK dissertations. DOI: aaltodoc.aalto.fi/handle/123456789/2551 [1-56] (2005).
Veis et al.: Quantum computing applied to calculations of molecular energies: CH2 benchmark. J Chem Phys. 133(19):194106 doi:10.1063/1.3503767 [1-29](2010).
Venuti et al.: Adiabaticity in open quantum systems. arXiv:1508.05558v2 Phys. Rev. A93(3):032118, pp. 1-12 DOI:10.1103/PhysRevA.93.032118 (2016).
Vinci et al. Quantum annealing correction with minor embedding. Physical Review A 92.4 (34 pgs) (Jul. 2015).
Wah, et al. Simulated Annealing with Asymptotic Convergence for Nonlinear Constrained Global Optimization. Principles and Practice of Constraint Programming—CP'99: 5th International Conference, CP'99, Alexandria, VA, USA, Oct. 11-14, 1999. Proceedings 5. Springer Berlin Heidelberg, 1999.

Wang et al. Population Annealing: Theory and Application in Spin Glasses. Physics Review E 92:961 (2015).
Waskiewicz: Friend of a friend influence in terrorist social networks. In Proceedings of the International Conference on Artificial Intelligence (ICAO, pp. 1-5. The Steering Committee of The World Congress in Computer Science, Computer Engineering and Applied Computing (WorldComp) (2012).
Wendin: Quantum information processing with superconducting circuits: a review. Rep Prog Phys. 80(10):106001 doi:10.1088/1361-6633/aa7e1a [1-50](2017).
White. Density Matrix Formulation for Quantum Renormalization Groups. Physical Review Letters 69:286 (1992).
Whitfield et al., Simulation of electronic structure Hamiltonians using quantum computers. Molecular Physics 109(5):735-750 (2011).
Wigner et al. Paulische equivalence ban. Magazine for physics 47:631 (1928) (English Abstract).
Wikipedia. Automatic Differentiation. Article from Nov. 23, 2016. https://en.wikipedia.org/w/index.php?title=Automatic_differentiation&oldid=751071969. Accessed Jan. 29, 2023. (Year: 2016).
Wooters et al. The no-cloning theorem. Physics Today 62(2):76-77 (2009).
Wouters et al. A Practical Guide to Density Matrix Embedding Theory in Quantum Chemistry. J Chem Theory Comput. 12(6):2706-19 (2016).
Xu et al.: Neural network state estimation for full quantum state tomography. ArXiv preprint doi:arxiv.org/abs/1811.06654 [1-8] (2018).
Yanagimoto, et al. Engineering a Kerr-based Deterministic Cubic Phase Gate via Gaussian Operations. Physical Review Letters 124.24 (2020): 240503.
Yang. Direct calculation of electron density in density-functional theory: Implementation for benzene and a tetrapeptide, Physical Review A 44:(11):7823-7826 (1991).
Zahedinejad et al.: Multi-Community Detection in Signed Graphs Using Quantum Hardware. arXiv.org, 1QBit online research paper, Cornell University, arXiv:1901.04873v1 [quant-ph], pp. 1-10 (2019).
Zhu, et al. Training of quantum circuits on a hybrid quantum computer. Sci Adv. Oct. 2019;5(10): eaaw9918. Published online Oct. 18, 2019. doi: 10.1126/sciadv.aaw9918.
Zimmerman et al. Strong Correlation in Incremental Full Configuration Interaction. Journal of Chemical Physics 146:224104 (2017).
Zulehner et al. Efficient mapping of quantum circuits to the IBM QX architectures. In Design, Automation & Test in Europe Conference & Exhibition 2018 38(7):1226-1236 (2018).
Booth, K.E.C. et al., Comparing and Integrating Constraint Programming and Temporal Planning for Quantum Circuit Compilation, Twenty-Eighth International Conference on Automated Planning and Scheduling (ICAPS 2018), pp. 366-374 (2018).
Herbert, S. et al., Using Reinforcement Learning to find Efficient Qubit Routing Policies for Deployment in Near-term Quantum Computers, arXiv:1812.11619, pp. 1-13 (Dec. 30, 2018).
PCT/IB2023/056105 International Search Report and Written Opinion dated Oct. 16, 2023.
PCT/IB2023/060066 International Search Report and Written Opinion dated Dec. 20, 2023.
Pilch, J. et al., An FPGA-based real quantum computer emulator, Journal of Computational Electronics 18:329-342 (2019).
Sinha, A. et al., Qubit Routing using Graph Neural Network aided Monte Carlo Tree Search, arXiv:2104:01992v1, pp. 1-10 (Apr. 1, 2021).
Lucas, Andrew. Ising Formulations of many NP problems. Frontiers in Physics 2:5, 1-15 (2014).

* cited by examiner

METHODS AND SYSTEMS FOR SOLVING AN OPTIMIZATION PROBLEM USING A FLEXIBLE MODULAR APPROACH

CROSS-REFERENCE

This application is a continuation of International Patent Application No. PCT/CA2021/050709, filed May 26, 2021, which claims the benefit of U.S. Provisional Application No. 63/030,803, filed May 27, 2020, each of which is incorporated herein by reference in its entirety.

BACKGROUND

The classical solvers may be designed to run on CPUs and their performance may have benefitted from the steady exponential increase in available computational power, in the last couple of decades. However, doubling the performance of CPUs every two years is expected to reach its physical limit in the current decade. Since real-world optimization problems may be NP-hard, both exact and heuristic methods may utilize exponential computational effort to solve an optimization problem as its size grows. Accordingly, many optimization problems may be intractable as the size of the optimization problem grows.

SUMMARY

General classical optimization techniques, for example, those embedded in modern solvers such as CPLEX, Gurobi, SCIP, and Baron, may be based on a search tree and may be used to solve optimization problems in various domains such as service, transportation, healthcare, energy, and finance. However, most search-tree based classical solvers are exact, that is, they may be designed to approach global optimality. In other cases, a classical solver may be a heuristic solver. A heuristic solver may be designed to find increasingly better solutions as the computational effort is increased, whereas exact solvers are designed to prove optimality, which may happen at the end of the process. In some cases, the early termination of an exact solver may turn it into an inefficient heuristic solver. For example, an exact solver may terminate before reaching an exact solution. The commercial exact solvers are general solvers and may not be designed to benefit from the specific structure of a given problem type. Therefore, even medium-sized instances may be intractable for exact solvers. However, heuristic methods may also be efficient for solving practically relevant optimization problems. This may be true even if or especially if they exploit the structure of the problem class being solved, such as, for example, by taking advantage of a formulation that more naturally represents the problem. Further, while problem specific knowledge may aid in convergence, in some instances, it may be impractical to rely on problem-specific knowledge to design custom solvers for every problem type.

Recognized herein is the need for improved methods and systems that will overcome at least one of the above-identified drawbacks. The present disclosure provides methods and systems for solving an optimization problem using a flexible modular approach. The present disclosure may improve upon existing optimization solvers in at least some aspects. For example, the methods and systems disclosed herein may reduce the reliance on problem-specific knowledge to design custom solvers for every problem type. For example, the methods and systems disclosed herein may help to sustain the computational performance growth rate in the post-Moore's law era. Methods and systems disclosed herein may be designed to work in concert with new technologies such as quantum and application-specific computing. These new computing technologies may be fast, general-purpose, and power efficient; however, they have yet to demonstrate their efficiency in solving industry problems.

Methods and systems disclosed herein may use new computational hardware to solve problems such as quadratic unconstrained binary optimization (QUBO) problems. QUBO problems may be of particular interest because a large number of optimization problems can be recast into a QUBO form in a polynomial time. Methods and systems disclosed herein may map the solution space of the original problem into an unconstrained and binary space, thereby addressing an obstacle to the practical usage of special-purpose hardware. Methods and systems disclosed herein may address existing difficulties with mapping to an unconstrained and binary space such as: increasing irregularity of the objective function thereby increasing susceptibility to outputting local rather than global extrema. For example, turning a constrained optimization problem into a QUBO may be achieved by expanding the search space to include infeasible solutions, which are penalized in the objective function. However, this may expand the solution space significantly such that the ratio of infeasible solutions to feasible solutions is exponential. Furthermore, it makes the objective function highly irregular and leads to a search space with many local extrema. As a result, it may be significantly harder for the solver to find optimal or near-optimal solutions.

In an aspect, a method for solving an optimization problem inputted by a user is provided. The method may comprise: (a) using an interface of a digital computer to receive an indication of (i) said optimization problem, (ii) one or more optimization problem specifications of a plurality of optimization problem specifications, (iii) at least one generation method and at least one evaluation method, (iv) one or more algorithms of a plurality of algorithms, wherein said one or more algorithms is configured to solve said optimization problem subject to at least said one or more optimization problem specifications using said at least one generation method and said at least one evaluation method, and (v) one or more computational platforms of a plurality of computational platforms, wherein said one or more computational platforms is configured to execute said one or more algorithms; (b) transmitting a request to said one or more computational platforms to execute said one or more algorithms, wherein upon execution of said one or more algorithms by said one or more computational platforms said one or more computation platforms yields a solution to said optimization problem; and (c) providing said solution to said optimization problem from said computational platform at said interface.

In some embodiments, said interface is a user interface (UI). In some embodiments, said UI is a graphical UI (GUI). In some embodiments, said one or more optimization problem specifications comprises at least one of: a search space comprising configurations of a plurality of search spaces, one or more objective functions of a plurality of objective functions, an allowed move of a plurality of allowed moves, or at least zero constraints of a plurality of constraints. In some embodiments, (a)(ii) comprises on said interface (1) presenting at least a subset of said plurality of optimization problem specifications to said user and (2) receiving a selection of said one or more optimization problem specifications from said user. In some embodiments, the method further comprises receiving a selection of said one or more optimization problem specifications from said user, wherein said selection comprises one or more of a selected search space comprising configurations, a selected allowed move, one or more selected objective functions, and at least zero selected constraint.

In some embodiments, (a)(iii) comprises on said interface (1) presenting a plurality of generation methods and a plurality of evaluation methods to said user and (2) receiving a selection of said at least one generation method and said at least one evaluation method from said user. In some embodiments, said at least one generation method generates at least one configuration from a search space and wherein said at least one generation method generates at least one allowed move within said search space. In some embodiments, said at least one evaluation method evaluates one or more objective functions and determines that at least zero constraints are satisfied for a given configuration.

In some embodiments, (a)(iv) comprises on said interface (1) presenting at least a subset of said plurality of algorithms to said user and (2) receiving a selection of said one or more algorithms from said user. In some embodiments, (a)(iv) comprises on said interface (1) presenting at least a subset of said plurality of computational platforms to said user and (2) receiving a selection of said one or more computational platforms from said user. In some embodiments, (b) comprising aiding or suggesting said selection by said interface.

In some embodiments, (b) comprises executing said one or more algorithms until a stopping criterion is met on said one or more computational platforms. In some embodiments, said interface is configured to communicate with said plurality of computational platforms over a network.

In some embodiments, said one or more optimization specifications further comprises at least one constraints handling procedure. In some embodiments, said at least one constraints handling procedure comprises at least one of: incorporating static and adaptive penalty terms into said one or more objective function, rejection sampling or rejection of infeasible configurations, extending the search space to include Lagrange multipliers, or embedding techniques, optionally, wherein said embedding techniques comprise one or more of constraint programming, linear programming, and mixed-integer programming in said search space to restrict said search space. In some embodiments, said one or more algorithms employs said at least one constraints handling procedure.

In some embodiments, said one or more algorithms comprises one or more of: local search heuristic algorithms, simulated annealing, simulated quantum annealing, parallel tempering, population annealing, constrained population annealing, exhaustive search, greedy search, tabu search, path relinking, constrained simulated annealing, constrained parallel tempering, evolutionary search, or machine learning-based algorithms.

In some embodiments, said search space comprises one or more of: a search space comprising binary variables, a search space comprising integer variables, a search space comprising categorical variables, a search space comprising permutations, or a search space comprising continuous variables.

In some embodiments, said one or more computational platforms comprises one or more of: a field-programmable gate array (FPGA), an application-specific integrated circuit (ASIC), central processing unit (CPU), graphics processing unit (GPU), a tensor processing unit (TPU), a tensor streaming processor (TSP), a quantum computer, a quantum annealer, integrated photonic coherent Ising machine, or an optical quantum computer.

In some embodiments, said optimization problem comprises one or more of: combinatorial optimization, constrained and unconstrained binary optimization, constrained and unconstrained integer optimization, constrained and unconstrained mixed-integer optimization, constrained and unconstrained continuous optimization, multi-objective optimization, or optimization under uncertainty.

In some embodiments, said one or more objective functions comprise one or more of: a linear objective function, a quadratic objective function, a non-linear objective function, a non-linear convex objective function, a non-linear non-convex objective function, a look-up table objective function, or a black-box objective function. In some embodiments, said at least zero constraints comprises one or more of: a linear equality constraint, a linear inequality constraint, a quadratic constraint, a non-linear parametric constraint, a look-up table constraint, or a black-box constraint.

In another aspect, a system for solving an optimization problem is provided. The system may comprise: an interface of a digital computer, said digital computer operatively coupled to a memory comprising instructions, wherein said digital computer is configured to execute said instructions to at least: receive an indication of (i) said optimization problem, (ii) one or more optimization problem specifications of a plurality of optimization problem specifications, (iii) at least one generation method and at least one evaluation method, (iv) one or more algorithms of a plurality of algorithms, wherein said one or more algorithms is configured to solve said optimization problem subject to at least said one or more optimization problem specifications using said at least one generation method and said at least one evaluation method, and (v) one or more computational platforms of a plurality of computational platforms, wherein said one or more computational platforms is configured to execute said one or more algorithms, wherein said interface is in communication with a computational platform configured to execute said one or more algorithms, to yield a solution to said optimization problem, wherein said solution to said optimization problem from said computational platform is provided at said interface.

In some embodiments, said interface is a user interface (UI). In some embodiments, said UI is a graphical UI (GUI). In some embodiments, said one or more optimization problem specifications comprises at least one of: a search space comprising configurations of a plurality of search spaces, one or more objective functions of a plurality of objective functions, an allowed move of a plurality of allowed moves, or at least zero constraints of a plurality of constraints. In some embodiments, said interface is configured to (1) present at least a subset of said plurality of optimization problem specifications to said user and (2) receive a selection of said one or more optimization problem specifications from said user. In some embodiments, said interface is configured to receive a selection of said one or more optimization problem specifications from said user, wherein said selection comprises one or more of a selected search space comprising configurations, a selected allowed move, one or more selected objective functions, and at least one selected constraint.

In some embodiments, said interface is configured to (1) present a plurality of generation methods and a plurality of evaluation methods to said user and (2) receive a selection of said at least one generation method and said at least one evaluation method from said user. In some embodiments, said at least one generation method is configured to generate at least one configuration from a search space and wherein said at least one generation method generates at least one allowed move within said search space. In some embodiments, said at least one evaluation method is configured to evaluate one or more objective functions and determines that at least zero constraints are satisfied for a given configuration.

In some embodiments, said interface is configured to (1) present at least a subset of said plurality of algorithms to said user and (2) receive a selection of said one or more algorithms from said user. In some embodiments, said interface is configured to (1) present at least a subset of said plurality of computational platforms to said user and (2) receive a selection of said one or more computational platforms from said user. In some embodiments, said selection is aided or suggested by said interface.

In some embodiments, said digital computer is configured to execute said instructions to execute said one or more algorithms until a stopping criterion is met on said one or more computational platforms. In some embodiments, said interface is configured to communicate with said plurality of computational platforms over a network.

In some embodiments, said one or more optimization specifications further comprises at least one constraints handling procedure. In some embodiments, said at least one constraints handling procedure comprises at least one of: incorporating static and adaptive penalty terms into the one or more objective functions, rejection sampling or rejection of infeasible configurations, or extending the search space to include Lagrange multipliers, or embedding techniques such as constraint programming, linear programming, and mixed-integer programming in the search space to restrict the search space. In some embodiments, said one or more algorithms employs said at least one constraints handling procedure.

In some embodiments, said one or more algorithms comprises one or more of: local search heuristic algorithms, simulated annealing, simulated quantum annealing, parallel tempering, population annealing, constrained population annealing, exhaustive search, greedy search, tabu search, path relinking, constrained simulated annealing, constrained parallel tempering, evolutionary search, or machine learning-based algorithms.

In some embodiments, said search space comprises one or more of: a search space comprising binary variables, a search space comprising integer variables, a search space comprising categorical variables, a search space comprising permutations, or a search space comprising continuous variables.

In some embodiments, said one or more computational platforms comprises one or more of: a field-programmable gate array (FPGA), an application-specific integrated circuit (ASIC), central processing unit (CPU), graphics processing unit (GPU), a tensor processing unit (TPU), a tensor streaming processor (TSP), a quantum computer, a quantum annealer, integrated photonic coherent Ising machine, or an optical quantum computer.

In some embodiments, said optimization problem comprises one or more of: combinatorial optimization, constrained and unconstrained binary optimization, constrained and unconstrained integer optimization, constrained and unconstrained mixed-integer optimization, constrained and unconstrained continuous optimization, multi-objective optimization, or optimization under uncertainty.

In some embodiments, said one or more objective functions comprise one or more of: a linear objective function, a quadratic objective function, a non-linear objective function, a non-linear convex objective function, a non-linear non-convex objective function, a look-up table objective function, or a black-box objective function.

In some embodiments, said at least zero constraints comprises one or more of: a linear equality constraint, a linear inequality constraint, a quadratic constraint, a non-linear parametric constraint, a look-up table constraint, or a black-box constraint.

In another aspect, a non-transitory computer readable medium comprising machine-executable code that upon execution by a digital computer in communication with a computational platform implements a method for solving an optimization problem from a user is provided. The method may comprise: (a) using an interface of a digital computer to receive an indication of (i) said optimization problem, (ii) one or more optimization problem specifications of a plurality of optimization problem specifications, (iii) at least one generation method and at least one evaluation method, (iv) one or more algorithms of a plurality of algorithms, wherein said one or more algorithms is configured to solve said optimization problem subject to at least said one or more optimization problem specifications using said at least one generation method and said at least one evaluation method, and (v) one or more computational platforms of a plurality of computational platforms, wherein said one or more computational platforms is configured to execute said one or more algorithms; (b) using said interface to transmit a request to said one or more computational platforms to execute said one or more algorithms to yield a solution to said optimization problem; and (c) providing said solution to said optimization problem from said computational platform at said interface.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
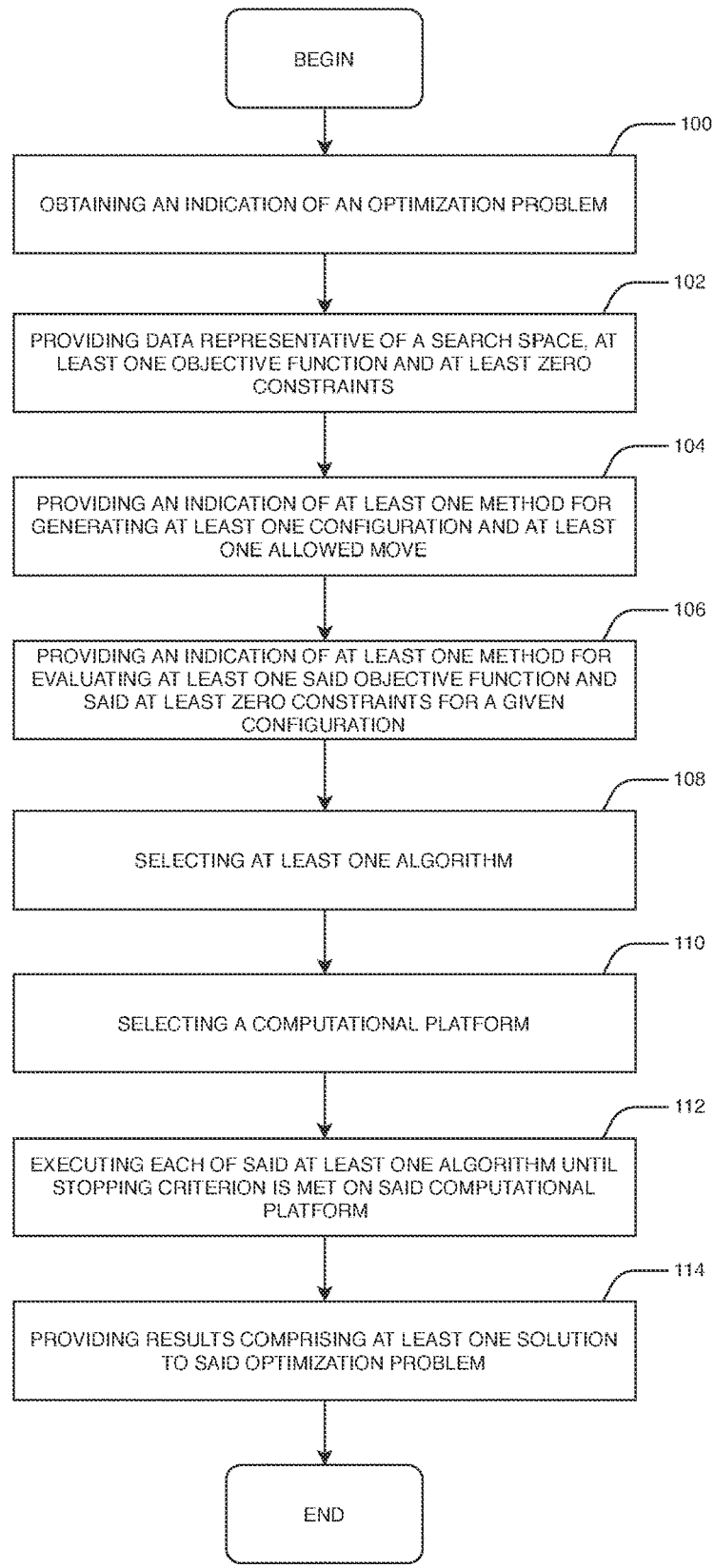
FIG. 1 is a flowchart of a method for solving an optimization problem using a flexible modular approach, in accordance with some embodiments disclosed herein.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

An optimization problem or a general optimization problem may be a problem of increasing or decreasing one or more of a set of objective functions until a stopping criterion is satisfied. A stopping criterion may be a threshold condition. In some cases, the optimization problem may comprise finding a maximum or near maximum. In some cases, the optimization problem may comprise find a minimum or near minimum. In some cases, the optimization problem may comprise finding a configuration or configurations of one or more decision variables among a set of possible configurations D to increase or decrease one or more of a set of objective functions $f(x)$ to a threshold condition. In some cases, the optimization problem may comprise increasing or decreasing one or more of a set of objective functions such that one or more of a set of constraints $C(x)$ is satisfied. An optimization problem may be denoted by P herein. Each constraint may represent a relationship among decision variables x. In a general optimization problem, there may be no restriction on decision variables' type and value. In a general optimization problem, there may be no restriction on the form of the objective functions and constraints. In some cases, the definition may include finding a near optimal solution or a number of near optimal solutions.

An objective function may be a function of decision variables which may be increased or decreased by varying input values and computing the value of the function. In some cases, an objective function may be a real function. In some cases, an objective function may be a function of decision variables which may be increased or decreased by choosing input values from within a set of input values and computing the value of the function. In some cases, the objective function may be a parametric function or a black-box function of decision variables. The objective function may accept a given configuration as an input and output a real value.

A configuration or solution candidate may comprise one or more of a set of possible values of decision variables. In some cases, a configuration may be a member of a set of possible configurations and may represent one configuration of decision variables. A configuration may be a member of the set of possible configurations, D, and may represent one configuration of variables, x.

A feasible configuration may be a configuration which satisfies each of the set of constraints. In some cases, a feasible configuration may be a configuration x which satisfies problem constraints in the set $C(x)$.

An infeasible configuration may be a configuration which does not satisfy at least one constraint of the set of constrains. In some cases, an infeasible configuration may be a configuration x which does not satisfy at least one of the constraints in the set $C(x)$.

A search space or a solution space may comprise a set of possible configurations. In some cases, a search space refers to a set of all possible configurations. In some cases, a search space refers to a set of searched configurations. In some cases, a search space is the set of possible configurations D. In some applications, the search space may be further adjusted by directly incorporating all, at least some, or at least one of the problem constraints such that it may include feasible configurations subject to all, at least some, or at least one of the problem constraints.

A move or allowed move may be a change from a first configuration to a second configuration. A first configuration and a second configuration may be within a search space. A first configuration and a second configuration may be within of a set of possible configurations. In some cases, a move may be generated subject to a prescription describing how the values of a given configuration change to generate a new configuration. In some cases, a move may change a configuration x to a second configuration x'.

A generation method may comprise one or more procedures related to generating or changing a configuration. In some cases, a generation method comprises one or more procedures that describe how to generate a configuration and a move. In some cases, a generation method comprises one or more procedures that describe how to transform a given configuration into a new configuration using a move.

An evaluation method may comprise one or more procedures related to evaluating at least one objective function at a configuration. An evaluation method may comprise one or more procedures that evaluate at least one objective function and at least zero constraints for a given configuration and a move.

A constraint may comprise a condition of an optimization problem which a solution must satisfy. Constraints may be integrated into the systems and methods herein using constraints handling procedures. A constraints handling procedure may guide the search toward feasible configurations. The constraints handling procedure may be embedded in the interface. A constraints handling procedure may be useful in the case wherein the search space includes both feasible and infeasible configurations and the generation method does not necessarily draw feasible configurations from the search space or does not generate moves that yield new feasible configurations when applied on the current feasible/infeasible configuration.

An optimization algorithm may comprise a set of operations that describe how to find a set of optimal or near optimal configurations for the optimization problem P.

An interface may comprise a computer implemented connection between the various components (e.g. software to software, software to hardware, software to user, etc.) of the system for solving an optimization problem. The interface may comprise a flexible modular configuration. For example, the interface may provide access to one or more modules. The interface may do one or more of the following: facilitate access to methods to draw configurations/moves, evaluate a set of objective functions and constraints for a given configuration/move, address the constraints when acting as an abstraction layer between algorithms and optimization problems, etc.

The interface may be a modular interface. In some cases, an interface may be a modular interface which connects aspects of the code represented as interchangeable modules. In some cases, the interface may provide access to one or more modules of a method for solving an optimization problem. In some cases, one or more modules may be provided which allows a user to provide one or more indications of a method for solving an optimization problem. An indication may comprise a selection from available options or a user may provide his or her own machine readable code.

For example, a module for selecting optimization problem specifications may comprise, on the interface, presenting at least a subset of a plurality of optimization problem specifications to a user and receiving a selection of one or more optimization problem specifications from the user. A selection of a subset of a plurality of optimization problem specifications may comprise one or more of a selected search space comprising configurations, a selected allowed move, one or more selected objective functions, and at least one selected constraint. In some cases, a user may provide his or her own machine-readable code comprising one or more optimization problem specifications.

For example, a module for selecting a generation method comprises, on said interface, presenting a plurality of generation methods to said user and receiving a selection of said at least one generation method from said user. In some cases, the at least one generation method generates at least one configuration from a search space. In some cases, the at least one generation method generates at least one allowed move within said search space. In some cases, a user may provide his or her own machine-readable code comprising a generation method.

For example, a module for selecting an evaluation method comprises, on said interface, presenting a plurality of evaluation methods to said user and receiving a selection of said at least one evaluation method from said user. In some cases, the at least one evaluation method evaluates one or more objective functions. In some cases, the at least one evaluation method determines that zero constraints are satisfied for a given configuration. In some cases, a user may provide his or her own machine-readable code comprising an evaluation method.

If a generation method and an evaluation method are provided, the interface may wrap the generation and the evaluation methods to draw and evaluate configurations/moves. Wrapping the generation and evaluation methods by the interface may be modular and flexible, but it may have some overhead. In some cases, a generation method and an evaluation method may be wrapped together to form a module. In some cases, for better performance, the user may decide to directly incorporate the methods for generation and evaluation of configurations and moves into the interface. For example, a user may incorporate their own methods by providing or writing machine readable code configured to: draw configurations/moves, to evaluate a set of objective functions and constraints for a given configuration/move, to deal with the constraints when acting as an abstraction layer between algorithms and optimization problems, etc.

For example, a module for selecting an algorithm comprises, on the interface, presenting at least a subset of the plurality of algorithms to the user and receiving a selection of the one or more algorithms from the user. In some cases, a user may provide his or her own machine-readable code comprising an optimization algorithm.

For example, a module for selecting a computational platform comprises, on the interface, presenting at least a subset of the plurality of computational platforms to the user and receiving a selection of the one or more computation platforms from the user. In some cases, the computation platform may be aided or suggested by the interface.

Because each module may comprise various implementations of the code, aspects of the present disclosure may advantageously provide a flexible platform for solving optimization problems. Because each module may allow a user to provide their own problem indications, the platform may provide additional flexibility to adapt to sophisticated users while providing more specific options to less sophisticated users.

As another non-limiting advantage, the interface may act as an abstraction layer between the optimization problem and the algorithms used to solve the optimization problem. In some cases, the interface may shield a user from machine code. For example, in some cases, the interface may aid or select various indications of various portions of an optimization problem, for example: the optimization problem, the one or more optimization problem specifications of a plurality of optimization problem specifications, the at least one generation method and at least one evaluation method, the one or more algorithms of a plurality of algorithms, and a selection of one or more computational platforms of a plurality of computational platforms. In some cases, the various indications may be provided automatically by the interface, e.g., without the input of a user. Such cases may include pre-implemented interfaces or pre-implemented generation methods as disclosed elsewhere herein. In some cases, the various options for indications may be automatically removed by the interface, e.g., without the input of a user, if such options are non-feasible for the particular optimization problem.

As another non-limiting advantage, the flexible nature of the interface may facilitate implementation of various types of optimization problems on various hardware types including classical and non-classical computational platforms. The interface may facilitate implementation of various types of optimization problems on various hardware types including binary solvers. In some cases, an interface as described herein may be agnostic to the computational platform. In some cases, an interface as described herein may facilitate accesses to various types of computational platforms. In some cases, at least one of these types of computational platforms is a non-classical computer, e.g., a quantum computer. The methods included in the interface may address constraints, if any.

In some cases, a user interface may be provided in addition to the modular interface. For example, the user interface may allow a user to provide one or more indications of various portions of an optimization problem including, for example: the optimization problem, the one or more optimization problem specifications of a plurality of optimization problem specifications, the at least one generation method and at least one evaluation method, the one or more algorithms of a plurality of algorithms, and a selection of one or more computational platforms of a plurality of computational platforms. In some cases, the user interface may be a graphical user interface.

In some cases, a module for selecting a computational platform comprises or is operably connected to a hardware interface. The hardware interface may facilitate connection to various hardware types, including classical and non-classical computational platforms, to facilitate implementation of various types of optimization problems. The hardware interface may be configured to communicate with the plurality of computational platforms over a network. In some cases, the network is a local network. In some cases, the computational platform is remote to the modular interface. For example, a user interface may be on machine local to a user, a modular interface may be implemented via a networked server which is local or remote to a user, and a computational platform may be local or remote to each of the networked server or the user.

As another non-limiting advantage, the flexible nature of the interface may allow for implementation of the computationally expensive procedures in generation, evaluation, and/or interface on special-purpose hardware if possible or on massively parallel devices such as an FPGA, GPU, and/or ASIC.

Optimization Problems

At least two classical optimization problems are used herein to illustrate the examples disclosed in FIGS. 1-6, e.g., a travelling salesperson problem and a vehicle routing problem. The travelling salesperson problem and the vehicle routing problem are shown as non-limiting examples meant to illustrate the functionality of the methods and systems disclosed herein. Other types of optimization problems are possible. Methods and systems disclosed herein may not be limited to solving optimization problems of a particular form. For example, methods and systems of the present disclosure may employ optimization problems in at least the following types, e.g., linear programming, mixed integer programming, QUBO, etc.

In some cases, an optimization problem comprises a travelling salesperson problem. The travelling salesperson problem may be formulated as follows: given a number of cities and distances between each city pair, find a shortest path to start from the depot, visit each city once, and return to the depot. A shortest path may be a shortest path found in a search of configuration up to a threshold condition. A threshold condition may comprise, for example, reaching a threshold number of iterations, a value being reduced below a threshold hold amount per iteration, etc.

In some cases, an optimization problem comprises a vehicle routing problem. The vehicle routing problem may be formulated as follows: given a number of cities and a number of vehicles, find assignment of cities to vehicles and a route for each vehicle such that the total distance travelled is minimized or reduced below a threshold condition. A threshold condition may comprise, for example, reaching a threshold number of iterations, a value being reduced below a threshold hold amount per iteration, etc.

Optimization Algorithms

Examples of optimization algorithms include but are not limited to: greedy search, simulated annealing, rejection-free simulated annealing, tabu search, path relinking, parallel tempering, population annealing, constrained simulated annealing, simulated quantum annealing, genetic/evolutionary algorithm, constrained population annealing, constrained parallel tempering, exhaustive search, and other meta heuristic approaches.

In some cases, an optimization algorithm comprises a greedy algorithm. A greedy algorithm is a local search algorithm that iteratively improves the current configuration. It may initialize at a random configuration and its corresponding objective function values. At each iteration, it may construct a neighborhood around the current configuration. The neighborhood may comprise a set of prospective moves. It may continue the search by accepting the move that improves the current objective function values the most, if any. It may update the current configuration to the new configuration generated after applying the selected move. This procedure may continue until reaching the number of iterations. In some cases, the number of iterations may be specified in by a user, provided based on estimated computing resources, etc.

In some cases, an optimization algorithm comprises simulated annealing. Simulated annealing (SA) is an iterative, generic heuristic method that emulates the process of physical annealing to find an optimum or near optimum of an optimization problem. SA is a discrete time Markov chain. SA may act on a non-increasing temperature schedule. It may initialize at a random configuration, and at each temperature it may prescribe a random move. The probability of transitioning to a second configuration, generated by applying the move to the current configuration, may be calculated according to a Metropolis-Hastings criterion. A Metropolis-Hastings criterion may promote diversification at high temperatures and intensification at low temperatures. As with many of heuristic algorithms, reaching a local optimum or near optimum at the lowest temperature is a likely scenario in SA. To increase the likelihood of reaching the global optimum or near optimum, this process may be repeated multiple times, each time starting from a random initial solution. See Kirkpatrick, S., et al., "Optimization by simulated annealing," Science, vol. 220, pp. 671-680 (1983), which is incorporated entirely herein by reference for all purposes.

In some cases, an optimization algorithm comprises rejection-free simulated annealing. The rejection-free simulated annealing is a Markov chain algorithm that differs from the simulated annealing algorithm in at least two aspects. At each temperature, 1) it may propose a number of moves for the given current configuration, and 2) it may transition to a second configuration with probability one. The second configuration may be chosen according to a probability distribution, which probability distribution may be normalized according to the Boltzmann factors associated with each proposed move. See J. W. Greene and K. J. Supowit, "Simulated annealing without rejected moves," IEEE Transactions on Computer-Aided Design of Integrated Circuits and Systems, 5(1):221-228, (1986), which is incorporated entirely herein by reference for all purposes.

In some cases, an optimization algorithm comprises a tabu search. Tabu search is an iterative improvement algorithm that maintains the search history by recording the moves chosen in the tabu list for a given number of iterations e.g., tabu tenure. This method may avoid cycling where the same region of the search space is repeatedly visited. The algorithm may begin at a random initial configuration. At each iteration, it may construct a number of moves for the current configuration, may accept the best non-tabu move, and may update the current configuration to a second configuration. It may then proceed to the next iteration by adding the selected move to the tabu list. See Glover F., and Laguna M., "Tabu Search," Du D Z., Pardalos P. M. (eds) *Handbook of Combinatorial Optimization*, Springer, Boston, MA (1998), which is incorporated entirely herein by reference for all purposes.

In some cases, an optimization algorithm comprises path-relinking. Path relinking algorithm uses an internal local search solver such as simulated annealing or tabu search to first generate a selected solution list composed of a number of local optima or near optima. It may start from distinct configurations connecting pairs of local optima or near optima and may improve them using an internal local search solver. See Resendel M. G., and Ribeiro C. C., "GRASP with Path-Relinking: Recent Advances and Applications," *Metaheuristics: Progress as Real Problem Solvers. Operations Research/Computer Science Interfaces Series*, Ibaraki T., Nonobe K., Yagiura M. (eds), Springer, Boston, MA (2005), which is incorporated entirely herein by reference for all purposes.

In some cases, an optimization algorithm comprises parallel tempering. The parallel tempering Monte Carlo algorithm simulates M replicas of the original system at different temperatures. The parallel tempering may use periodic exchanges based on a Metropolis-Hastings criterion between neighboring temperatures. Replica-exchange moves may allow replicas to perform a random walk in temperature space. This may enable the algorithm to efficiently overcome energy barriers. Replicas at high temperatures may improve algorithmic mixing, whereas replicas at low temperatures may reach equilibrium on a shorter time scale compared to some simulations at a fixed low temperature. In some cases, the parallel tempering algorithm may be more efficient than the simulated annealing algorithm in optimization and sampling applications. See Hukushima K., and Nemoto K., "Exchange Monte Carlo Method and Application to Spin Glass Simulations," *Journal of the Physical Society of Japan*, 65, 1604 (1996), which is incorporated entirely herein by reference for all purposes.

In some cases, an optimization algorithm comprises population annealing. Population annealing is a sequential Monte Carlo algorithm that performs a sequence of resampling and Monte Carlo simulation operations. It initializes with a population of configurations generated at random. At each temperature, it first resamples the population at the temperature such that the population at the current temperature has a Boltzmann distribution. It then proceeds by performing a number of Monte Carlo operations for each configuration in the resampled population. The resampling/simulation operations continue for a given number of times. See Wang W., Machta J., and Katzgraber H. G., "Population Annealing: Theory and Application in Spin Glasses," *Physics Review E*, 92, 961 (2015), which is incorporated entirely herein by reference for all purposes.

In some cases, an optimization algorithm comprises constrained simulated annealing. Constrained simulated annealing performs a sequence of Monte Carlo simulation operations. The sequence of Monte Carlo simulation operations may be performed in an extended search space combining decision variables and Lagrange multipliers. For a minimization/maximization problem, the search may represent a Markov Chain that performs probabilistic descents/ascent in the original solution space and probabilistic ascents/descents in the Lagrange multipliers space. See Wah B. W., Wang T., "Simulated Annealing with Asymptotic Convergence for Nonlinear Constrained Global Optimization," *Principles and Practice of Constraint Programming—Lecture Notes in Computer Science*, Jaffar J. (eds), Springer, Berlin, Heidelberg (1999), which is incorporated entirely herein by reference for all purposes.

In some cases, an optimization algorithm comprises a genetic/evolutionary algorithm. Evolutionary algorithms are population-based improvement algorithms that are inspired by evolutionary theory. Although there are various ways to implement evolutionary mechanisms, the general idea is to improve the average fitness of the population through exposing each individual in the population to external pressure that leads to the survival of the fittest individuals. See Andrew N. Sloss and Steven Gustafson, "Evolutionary Algorithms Review," arXiv:1906.08870, (2019), which is incorporated entirely herein by reference for all purposes.

Objective Functions

Each objective function in the set of objective functions may represent one or more of a parametric, non-parametric, or black-box real-valued function of the decision variables that may be reduced or increased to a threshold condition. The input and output to each objective function may be, in respective terms, a configuration from the set of possible configurations and a real value. Some examples of minimizing an objective function include the total time and distance traveled in routing applications, the total time to process jobs in scheduling applications, the number of resources used in resource planning applications, the operational cost in healthcare and service applications, etc. Some examples of maximizing an objective function include the profit of investment in finance applications, the reliability in asset management applications, and the similarity in clustering applications.

Computational Platform

Computational platform may comprise various types of hardware in any combination. Each of the hardware may be used as part of the system, to execute the whole method, or any part of it, alone, or in combination with other hardware. In some cases, the hardware may be used for various operations of the methods disclosed herein, including, for example, one or more of the following:

Evaluation of the objective functions given an initial configuration.

Evaluation of the constraints given an initial configuration.

Evaluation of the objective functions given a configuration and objective functions' values, and a prospective move.

Evaluation of the constraints given a configuration and objective functions' values, and a prospective move.

Execution of an optimization algorithm or a part of an optimization algorithm.

Generation of random numbers.

Calculation of Boltzmann factors for prospective moves.

Generation of new moves.

Generation of random solutions.

Execution of functions of the interface, including a part or all of the above.

A computational platform may comprise a central processing unit (CPU). A CPU may be a low latency integrated circuit chip which comprises the main processor in a computer. A CPU may execute instructions as given by an algorithm. A CPU may comprise a component configured to do one or more of the following: executing arithmetic and logic operations, registering that store the results of those operations, and directing the operations of the former using a control unit.

A computational platform may comprise a graphics processing unit (GPU). A GPU may be specialized electronic circuit optimized for high throughput—can perform the same set of operations in parallel on many data blocks at a time.

A computational platform may comprise a field-programmable gate array (FPGA). An FPGA may comprise an integrated circuit chip that comprises configurable logic blocks and programmable interconnects. Can be programmed after manufacturing to execute custom algorithms.

A computational platform may comprise an application-specific integrated circuit (ASIC). An ASIC may be an integrated circuit chip that is customized to run a specific algorithm and cannot be programmed after manufacturing.

A computational platform may comprise a tensor processing unit (TPU). A TPU may comprise a proprietary type of ASIC developed for low bit precision processing by Google® Inc., see Patent Application US 2016/0342891, which is incorporated entirely herein by reference for all purposes.

A computational platform may comprise a tensor streaming processor (TSP). A TSP may be a domain-specific programmable integrated chip that is designed for linear algebra computations as they may be performed in Artificial Intelligence applications, such as GWENNAP, "Grog Rocks Neural Networks," The Linley Group Microprocessor Report, Jan. 6, 2020, which is incorporated entirely herein by reference for all purposes.

Non-Classical Computer

The present disclosure provides systems and methods that may include quantum computing or use of quantum computing. Quantum computers may be able to solve certain classes of computational tasks more efficiently than classical computers. However, quantum computation resources may be rare and expensive, and may involve a certain level of expertise to be used efficiently or effectively (e.g., cost-efficiently, or cost-effectively). A number of parameters may be tuned in order for a quantum computer to deliver its potential computational power.

Quantum computers (or other types of non-classical computers) may be able to work alongside classical computers as co-processors. A hybrid architecture (e.g., computing system) comprising a classical computer and a quantum computer can be very efficient for addressing complex computational tasks, such as quantum chemistry simulations. Systems and methods disclosed herein may be able to efficiently and accurately implement a quantum problem on a non-classical computer with a reduced number of single and two-qubit gates.

Although the present disclosure has referred to quantum computers, methods and systems of the present disclosure may be employed for use with other types of computers, which may be non-classical computers. Such non-classical computers may comprise quantum computers, hybrid quantum computers, quantum-type computers, or other computers that are not classical computers. Examples of non-classical computers may include, but are not limited to, Hitachi Ising solvers, coherent Ising machines based on optical parameters, and other solvers which utilize different physical phenomena to obtain more efficiency in solving particular classes of problems.

In some cases, a quantum computer may comprise one or more adiabatic quantum computers, quantum gate arrays, one-way quantum computers, topological quantum computers, quantum Turing machines, superconductor-based quantum computers, trapped ion quantum computers, trapped atom quantum computers, optical lattices, quantum dot computers, spin-based quantum computers, spatial-based quantum computers, Loss-DiVincenzo quantum computers, nuclear magnetic resonance (NMR) based quantum computers, solution-state NMR quantum computers, solid-state NMR quantum computers, solid-state NMR Kane quantum computers, electrons-on-helium quantum computers, cavity-quantum-electrodynamics based quantum computers, molecular magnet quantum computers, fullerene-based quantum computers, linear optical quantum computers, diamond-based quantum computers, nitrogen vacancy (NV) diamond-based quantum computers, Bose-Einstein condensate-based quantum computers, transistor-based quantum computers, and rare-earth-metal-ion-doped inorganic crystal based quantum computers. A quantum computer may comprise one or more of: quantum annealers, Ising solvers, optical parametric oscillators (OPO), and gate models of quantum computing.

A computational platform may comprise a non-classical computer which is a gate model quantum computer. A gate model quantum computer may comprise quantum bits, referred to as qubits, and a network of quantum logic gates. In a gate model quantum computer computations may be performed by initializing quantum states, running them through a sequence of quantum gates (a quantum circuit) and performing measurements on the states.

A computational platform may comprise a non-classical computer which is a quantum annealer. A quantum annealer may comprise a quantum mechanical system consisting of manufactured qubits, local field biases, and couplings between pairs of qubits. The biases and couplings may be controllable. A quantum annealer may allow the quantum annealer to be programmed such that it can be used as a heuristic solver for Ising problems, equivalent to quadratic unconstrained binary optimization (QUBO) problems. See McGeoch, et al., "Experimental Evaluation of an Adiabatic Quantum System for Combinatorial Optimization," Computing Frontiers, May 14-16, 2013 and the Patent Application US 2006/0225165, each of which is incorporated entirely herein by reference for all purposes.

A computational platform may comprise a non-classical computer which is an optical computing device. Another example of an analogue system suitable for technology disclosed herein is an optical device. In some cases, the optical device comprises a network of optical parametric oscillators (OPOs) as disclosed in the patent applications US 2016/0162798 and WO 2015006494, which are each incorporated herein by reference in their entireties.

A computational platform may comprise a non-classical computer which is an integrated photonic coherent ising machine. An example of an analogue system suitable for technology disclosed herein is an Integrated photonic coherent Ising machine disclosed in the patent application US 2018/0267937, which is incorporated entirely herein by reference for all purposes. In some cases, an Integrated photonic coherent ising machine may comprise a combination of nodes and a connection network solving a particular Ising problem. In some cases, the combination of nodes and the connection network may form an optical computer that is adiabatic. The combination of the nodes and the connection network may non-deterministically solve an Ising problem when the values stored in the nodes reach a steady state to minimize the energy of the nodes and the connection network. Values stored in the nodes at the minimum energy level may be associated with values that solve a particular Ising problem. The stochastic solutions may be used as samples from the Boltzmann distribution defined by the Hamiltonian corresponding to the Ising problem.

Classical Computer

In some cases, the systems, media, networks, and methods described herein comprise a classical computer, or use of the same. In some cases, a classical computer may comprise a digital computer. In some cases, the classical computer includes one or more hardware central processing units (CPUs) that carry out the classical computer's functions. In some cases, the classical computer further comprises an operating system (OS) configured to perform executable instructions. In some cases, the classical computer is connected to a computer network. In some cases, the classical computer is connected to the Internet such that it accesses the World Wide Web. In some cases, the classical computer is connected to a cloud computing infrastructure. In some cases, the classical computer is connected to an intranet. In some cases, the classical computer is connected to a data storage device.

In accordance with the description herein, suitable classical computers may include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Smartphones may be suitable for use with methods and systems described herein. Select televisions, video players, and digital music players, in some cases with computer network connectivity, may be suitable for use in the systems and methods described herein. Suitable tablet computers may include those with booklet, slate, and convertible configurations.

In some cases, the classical computer includes an operating system configured to perform executable instructions. The operating system may be, for example, software, including programs and data, which manages the device's hardware and provides services for execution of applications. Suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Suitable personal computer operating systems may include, by way of non-limiting examples, Microsoft® Windows®, Apple® Mac OS X®, UNIX®, and UNIX-like operating systems such as GNU/Linux®. In some cases, the operating system is provided by cloud computing. Suitable mobile smart phone operating systems may include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Suitable media streaming device operating systems may include, by way of non-limiting examples, Apple TV®, Roku®, Boxee®, Google TV®, Google Chromecast®, Amazon Fire®, and Samsung® HomeSync®. Suitable video game console operating systems may include, by way of non-limiting examples, Sony® PS3®, Sony® PS4®, Microsoft® Xbox360®, Microsoft Xbox One, Nintendo® Wii®, Nintendo® Wii U®, and Ouya®.

In some cases, the classical computer includes a storage and/or memory device. In some cases, the storage and/or memory device is one or more physical apparatuses used to store data or programs on a temporary or permanent basis. In some cases, the device is volatile memory and requires power to maintain stored information. In some cases, the device is non-volatile memory and retains stored information when the classical computer is not powered. In some cases, the non-volatile memory comprises flash memory. In some cases, the non-volatile memory comprises dynamic random-access memory (DRAM). In some cases, the non-volatile memory comprises ferroelectric random access memory (FRAM). In some cases, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In some cases, the storage and/or memory device is a combination of devices such as those disclosed herein.

In some cases, the classical computer includes a display to send visual information to a user. In some cases, the display is a cathode ray tube (CRT). In some cases, the display is a liquid crystal display (LCD). In some cases, the display is a thin film transistor liquid crystal display (TFT-LCD). In some cases, the display is an organic light emitting diode (OLED) display. In some cases, on OLED display is a passive-matrix OLED (PMOLED) or active-matrix OLED (AMOLED) display. In some cases, the display is a plasma display. In other embodiments, the display is a video projector. In some cases, the display is a combination of devices such as those disclosed herein.

In some cases, the classical computer includes an input device to receive information from a user. In some cases, the input device is a keyboard. In some cases, the input device is a pointing device including, by way of non-limiting examples, a mouse, trackball, track pad, joystick, game controller, or stylus. In some cases, the input device is a touch screen or a multi-touch screen. In some cases, the input device is a microphone to capture voice or other sound input. In some cases, the input device is a video camera or other sensor to capture motion or visual input. In some cases, the input device is a Kinect, Leap Motion, or the like. In some cases, the input device is a combination of devices such as those disclosed herein.

The methods and systems disclosed herein may provide a novel flexible and modular computational framework for solving constrained optimization problems.

The methods and systems disclosed herein may not restrict the solution space of an optimization problem into a prescribed space, such as an unconstrained binary space when using the quantum annealer. This may allow user to benefit from the new computational technologies without converting to a prescribed space.

Methods and systems disclosed herein may provide a flexible modular approach, which approach may allow for incorporation of problem-specific knowledge in the generation and evaluation methods, such that the algorithms may not need to be changed for every problem.

Methods and the systems disclosed herein may encapsulate the strategy of the optimization methods in three high-level methods: generation, evaluation, and interface methods. The generation method may provide procedures to generate solution candidates and to walk in the search space by going from one solution candidate to another solution. The evaluation method comprises procedures to evaluate the objective functions, which may also comprise constraints for a given solution candidate. The generation and evaluation methods may be abstracted away from various optimization algorithms in the interface.

Methods and systems disclosed herein may not be limited to solving optimization problems of a particular form, e.g. linear programming, mixed integer programming, QUBO, etc. The interface may be flexible. For example, the interface may provide various options for a user to build an optimization problem. In some cases, there may be no restriction on how the procedures in the generation and evaluation methods are defined. If an option is missing, a user can provide code which can be used to adapt methods and systems disclosed herein. Methods and systems disclosed herein can handle a large number of optimization problems with various parametric and non-parametric functional forms representing the objective functions and constraints.

In some cases, the methods and systems disclosed herein may be equipped with pre-implemented generation methods for search spaces such as binary, permutation, categorical, and continuous. Multiple existing generation methods might be combined to create a new generation method for mixed solution spaces. The generation methods can be further adjusted to benefit from the knowledge and the structure specific to the given optimization problem. For a custom solution space, a new generation method can be implemented. In some cases, the methods and systems disclosed herein may, given a generation method and an evaluation method for an optimization problem, switch among various pre-implemented algorithms with no extra adjustment.

In some cases, the methods and systems disclosed herein includes pre-implemented interfaces that handle problem constraints utilizing various approaches. In some cases, it may be possible to use several different interfaces for solving a given optimization problem. The performance of each interface may be changed based on the problem characteristics. Custom interfaces can be added for better performance.

In some cases, the methods and systems disclosed herein may comprise a flexible modular design, which allows for utilization of new technologies in different methods where the computationally expensive procedures in generation, evaluation, and/or interface are implemented on special-purpose hardware if possible or on massively parallel devices such as FPGA, GPU, and/or ASIC.

FIG. 1 is a flowchart of a method for solving an optimization problem using a flexible modular approach, in accordance with some embodiments disclosed herein.

According to processing operation 100, an indication of an optimization problem is obtained as an input request using a communications interface. In some cases, the optimization problem may comprise any optimization problem described herein or any combination thereof. In some cases, the optimization problem is a combinatorial optimization problem. In some cases, the optimization problem is a constrained or unconstrained binary optimization problem. In some cases, the optimization problem is a constrained or unconstrained integer optimization problem. In some cases, the optimization problem is a constrained or unconstrained mixed-integer optimization problem. In some cases, the optimization problem is a constrained or unconstrained continuous optimization problem. In some cases, the optimization problem is a multi-objective optimization problem or an optimization problem under uncertainty.

Still referring to FIG. 1 and according to processing operation 102, data representative of a search space comprising configurations, of at least one objective function and of at least zero constraints is provided using the optimization problem. In some cases, the data representative is provided by a user. In some cases, the data representative is extracted by the computer-implemented method. In some cases, the search space may be of various types. In particular, the search space may be any search space described herein or any combination thereof. In some cases, the search space comprises binary variables. In some cases, the search space comprises integer variables. In some cases, the search space comprises categorical variables. In some cases, the search space comprises permutations. In some cases, the search space comprises continuous variables. In some cases, the search space is further adjusted by directly incorporating some of the problem constraints such that it may include feasible configurations.

According to processing operation 104, an indication of at least one method for generating at least one configuration and at least one allowed move is provided. In some cases, the generation method may be provided by a user. In some cases, the generation method is provided by the computer-implemented method. In some cases, the generation method may comprise procedures that describe how to generate a configuration and a move, and how to transform a given configuration into a new configuration using a move.

According to processing operation 106, an indication of at least one method for evaluating the objective functions and the constraints for a given configuration is provided. In some cases, the evaluation method may be provided by a user. In some cases, the evaluation method is provided by the computer-implemented method. In some cases, the evaluation method may comprise procedures that evaluate at least one objective function and at least zero constraints for a given configuration and a move.

Still referring to FIG. 1 and according to processing operation 108, at least one algorithm is selected. In some cases, the algorithm may be selected by a user, or by a computer-implemented method. The selected algorithm utilizes the methods as mentioned above to generate the configurations and the allowed moves and to evaluate the corresponding set of objective functions and constraints for a given configuration. In some cases, the algorithm may be of various types, it may be any algorithm, such as any algorithm described herein. In some cases, the algorithm is a member of the group consisting of local search heuristic algorithms, simulated annealing, simulated quantum annealing, parallel tempering, population annealing, constrained population annealing, exhaustive search, greedy search, tabu search, path relinking, constrained simulated annealing, constrained parallel tempering, evolutionary search, or machine learning-based algorithms.

According to processing operation 110, a computational platform comprising at least one processor is selected. In some cases, the computational platform may be of various types. The computational platform may be any suitable computational platform such as any computational platform described herein with respect to the system shown in FIG. 7. In some cases, the computational platform comprises at least one member of the group consisting of a field-programmable gate array (FPGA), an application-specific integrated circuit (ASIC), central processing unit (CPU), graphics processing unit (GPU), a tensor processing unit (TPU), a tensor streaming processor (TSP), a quantum computer, a quantum annealer and an optical quantum computer.

Still referring to FIG. 1 and according to processing operation 112, each of the at least one algorithm is executed on the computational platform until a stopping criterion is met. In some cases, the stopping criterion may be of various types for each of the selected algorithms. In some cases, the stopping criterion is met when the number of generated configurations reaches a certain value. In some cases, the stopping criterion is met when the convergence is established. In some cases, the algorithms may be executed in parallel. In some cases, the algorithms are executed sequentially. In some cases, the results of one of the algorithms is fed into another algorithm.

According to processing operation 114, results comprising at least one solution to the optimization problem are provided. In some cases, the result may be provided in various ways. In some cases, the results are provided via the communications interface.

The method for solving an optimization problem using a flexible modular approach may be implemented in various ways. One of many possible implementation embodiments called FOCUS, a flexible modular computational framework for solving constrained optimization problems is described herein.

Figure 2:
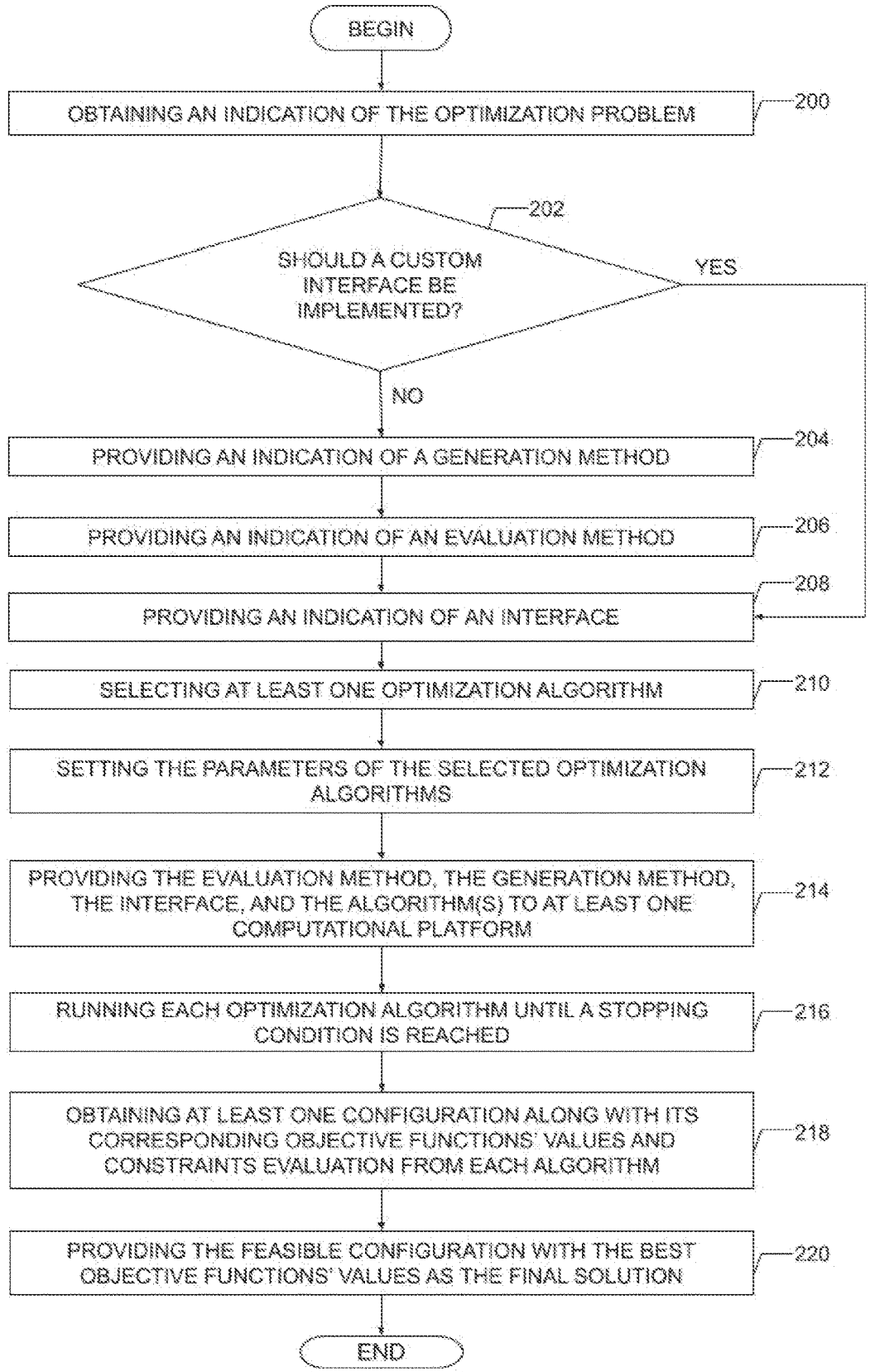
FIG. 2 is a flowchart of a method for solving an optimization problem using the flexible modular computational framework FOCUS, in accordance with some embodiments disclosed herein.

FIG. 2 is a flowchart of a method for solving an optimization problem using the flexible modular computational framework, FOCUS, in accordance with some embodiments disclosed herein. More precisely, FIG. 2 shows the high-level procedure for solving an optimization problem using the flexible modular computational framework, FOCUS.

According to the processing operation 200, an indication of the optimization problem is obtained as an input. In some cases, the optimization problem may be any optimization problem described herein or any combination thereof. In some cases, the optimization problem is a combinatorial optimization problem. In some cases, the optimization problem is a constrained or unconstrained binary optimization problem. In some cases, the optimization problem is a constrained or unconstrained integer optimization problem. In some cases, the optimization problem is a constrained or unconstrained mixed-integer optimization problem. In some cases, the optimization problem is a constrained or unconstrained continuous optimization problem. In some cases, the optimization problem is a multi-objective optimization problem or an optimization problem under uncertainty.

Figure 3:
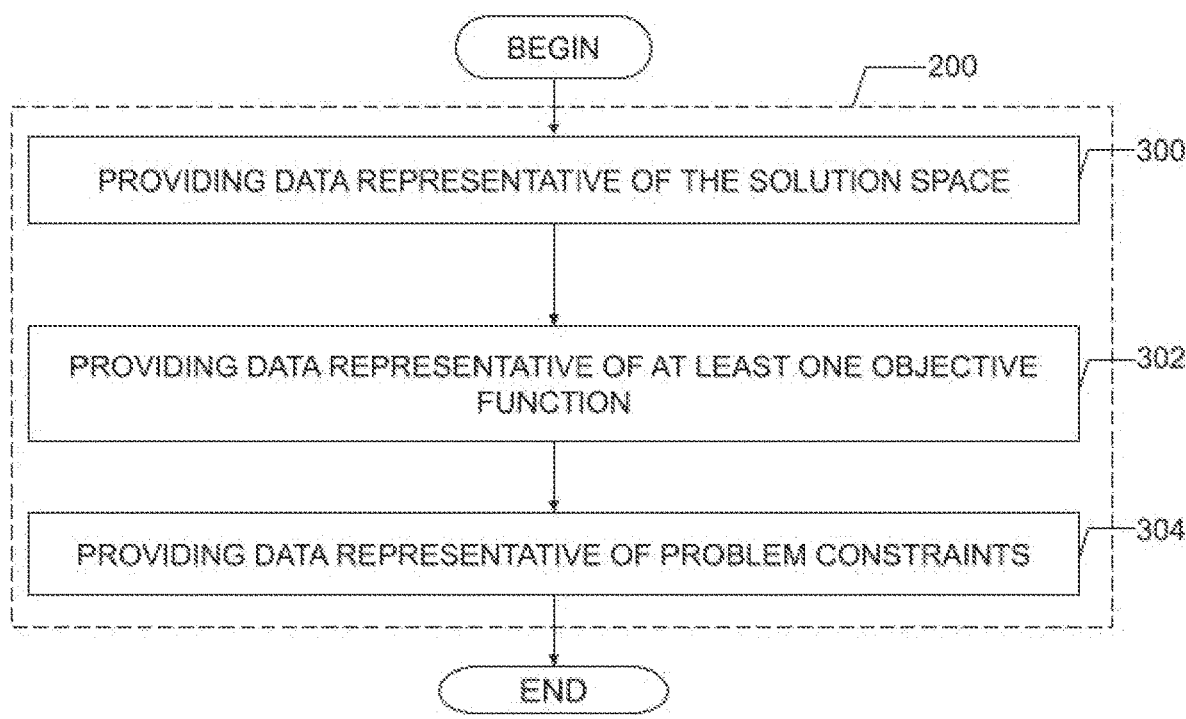
FIG. 3 is a flowchart of a procedure for providing an indication of the optimization problem, in accordance with some embodiments disclosed herein.

FIG. 3 is a flowchart of a procedure for providing an indication of the optimization problem, in accordance with some embodiments disclosed herein.

According to the processing operation 300, data representative of the solution space is provided. In some cases, the data representative is provided by a user. In some cases, data representative is extracted by the computer-implemented method.

For example, if the optimization problem is a travelling salesperson problem with n cities, the solution space comprises possible permutations of the n cities. The solution space size is then n!.

In another example wherein the vehicle routing optimization problem is provided with n cities and m vehicles, the solution space comprises possible assignments of the n cities to the m vehicles and possible permutations of the assigned cities to a given vehicle. The number of configurations in the solution space equals $$\binom{n}{n_1, n_2, \ldots n_m} n_1! n_2! \cdots n_m!,$$

where $n_1+n_2+ \ldots +n_m=n$, $0 \leq n_1, n_2, \ldots, n_m \leq n$.

Still referring to FIG. 3 and according to processing space 302, data representative of at least one objective function is provided.

In the travelling salesperson and the vehicle routing embodiments, the route length, and the sum of the lengths of the routes represent, in respective terms, the objective function.

According to processing operation 304, data representative of problem constraints is provided. In some cases, it may not be necessary to identify some or all of the problem constraints wherein the solution space is defined such that it may include only configurations that satisfy these constraints.

In classical routing examples such as travelling salesperson and vehicle routing problems, the problem constraints state that each city may be assigned to exactly one vehicle and each city may be visited exactly once. Defining the solution spaces as described in processing operation 300 satisfies the problem constraints by construction.

In the embodiment of the vehicle routing problem wherein there is an additional constraint that a set of cities cannot be served by the same vehicle, the solution space defined in processing operation 300 includes infeasible configurations. In this case, the problem constraints indicate the list of cities that cannot be served together.

Now referring back to FIG. 2 and according to the processing operation 202, it is determined if a custom interface is to be implemented for the optimization problem. In some cases, if the user is aiming for better performance, he/she may decide to incorporate the generation and the evaluation methods into the interface, otherwise, the interface may be a wrapper around generation and evaluation methods. If a custom interface is to be implemented, the procedure may continue to processing operation 208, if not, it may continue to processing operation 204.

According to processing operation 204, an indication of the generation method for generating at least one configuration and at least one allowed move is provided as an input. In some cases, the generation method may be provided by a user. In some cases, the generation method is provided by the computer-implemented method. In some cases, the generation method may comprise procedures that describe how to generate a configuration and a move, and how to transform a given configuration into a new configuration using a move.

Figure 4:
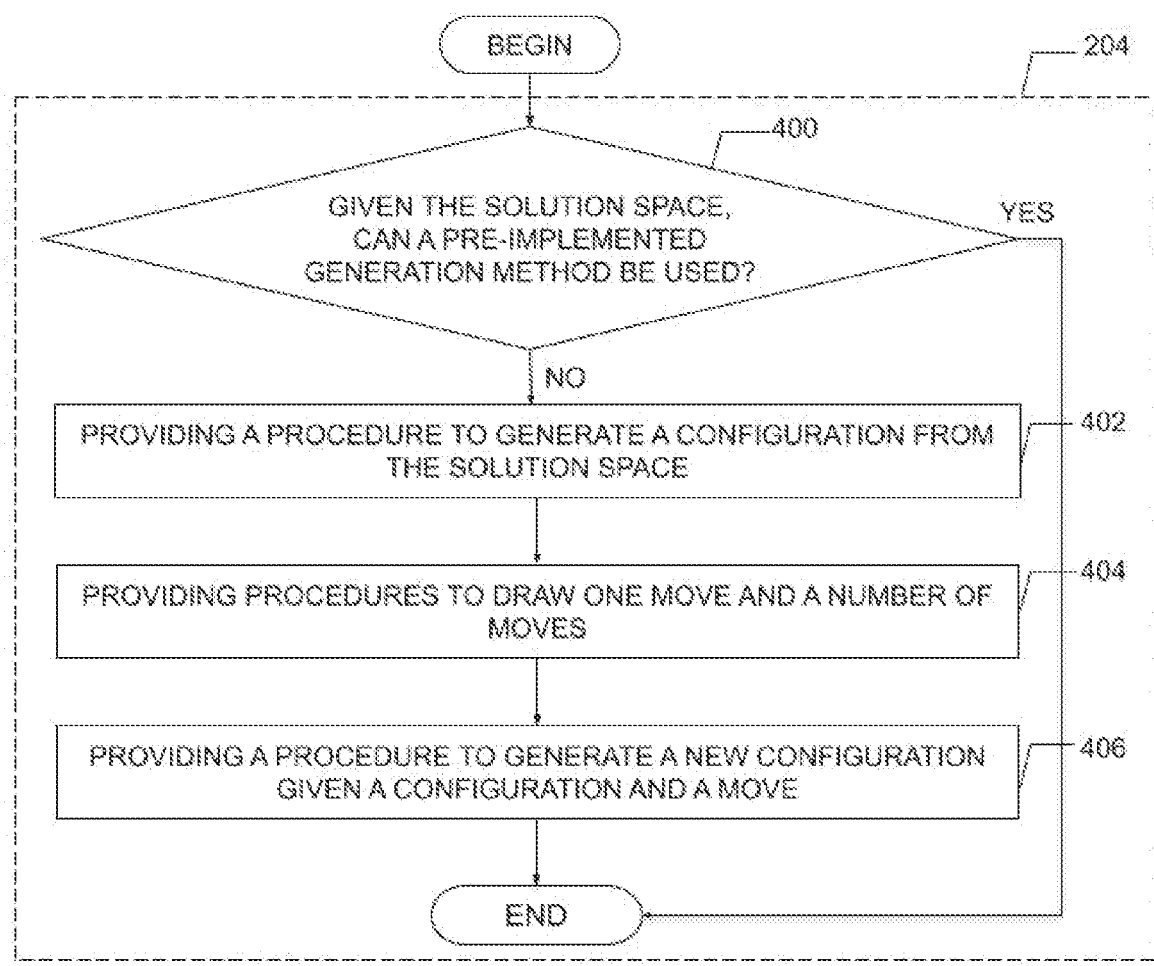
FIG. 4 is a flowchart of a procedure for initializing a generation method, in accordance with some embodiments disclosed herein.

FIG. 4 is a flowchart of a procedure for initializing a generation method, in accordance with some embodiments disclosed herein.

After identifying the solution space for the optimization problem, according to the processing operation 400, a decision may be made whether one of the pre-implemented generation methods in the flexible modular computational framework FOCUS can be used.

If one of the pre-implemented generation methods can be used, the generation method for the given optimization problem may be initialized with the selected generation method. In the embodiment wherein the optimization problem is a travelling salesperson problem example, the solution space is represented by a permutation and the PermutationGenerator in the flexible modular computational framework FOCUS can be used with no adjustment.

If none of the pre-implemented generation methods can be used, the procedure continues to processing operation 402. In the embodiment wherein the optimization problem is a vehicle routing problem, a custom generation method may be provided.

Still referring to FIG. 4 and according to processing operation 402, the custom generation method is provided by a procedure to generate a configuration x from the solution space D.

For the vehicle routing problem example, the following procedure generates a random configuration.
1. Initialize a list x containing an empty list for each vehicle
2. Randomize the list of n cities
3. Mark the cities as unvisited
4. While there is at least one city unvisited
    a. Pick a vehicle randomly
    b. Assign the city to the selected vehicle
    c. Make the city visited
5. Randomly shuffle the cities assigned to each vehicle
6. Return x as the random configuration The configuration x=[[4, 7, 1, 5, 8], [2, 6, 3]] represents an example generated by the above procedure indicating that the cities 4, 7, 1, 5, and 8 are served by the first vehicle and the second vehicle serves cities 2, 6, and 3.

Still referring to FIG. 4 and according to processing operation 404, the custom generation method is provided by procedures to generate at least one move in order for the optimization algorithm to navigate through the search space.

For the vehicle routing problem, a move may be drawn as below:
1. Given the current configuration x, pick a random city i from 1 to n
2. Pick a random vehicle j that currently does not serve city i
3. Pick a random position k in vehicle j's list of cities Iterating through the above procedure for a given number of times results in a number of moves.

In some cases, there are various ways to define a move for a given optimization problem.

In some cases, it may be sufficient to provide only one procedure to define a custom generation method in the flexible modular computational framework FOCUS. For the vehicle routing problem, examples of different moves may comprise:
swapping two cities assigned to two different vehicles
swapping the positions of two cities assigned to the same vehicle Still referring to FIG. 4 and according to processing operation 406, given the procedure for generating a move, a procedure of applying a given move to a given configuration is provided in order to navigate to a new configuration.

For the vehicle routing problem, representing the move as (i, j, k) and the current configuration x, the procedure in processing operation 406 may be:
Remove city i from its current vehicle and assign it to the k-th position in vehicle j's list of cities.

Now referring back to FIG. 2 and according to processing operation 206, an indication of the evaluation method for evaluating the objective functions and the constraints for a given configuration is provided as an input. In some cases, the evaluation method may be provided by a user. In some cases, the evaluation method is provided by the computer-implemented method. In some cases, the evaluation method may comprise procedures that evaluate at least one objective function and at least zero constraint for a given configuration and a move.

Figure 5:
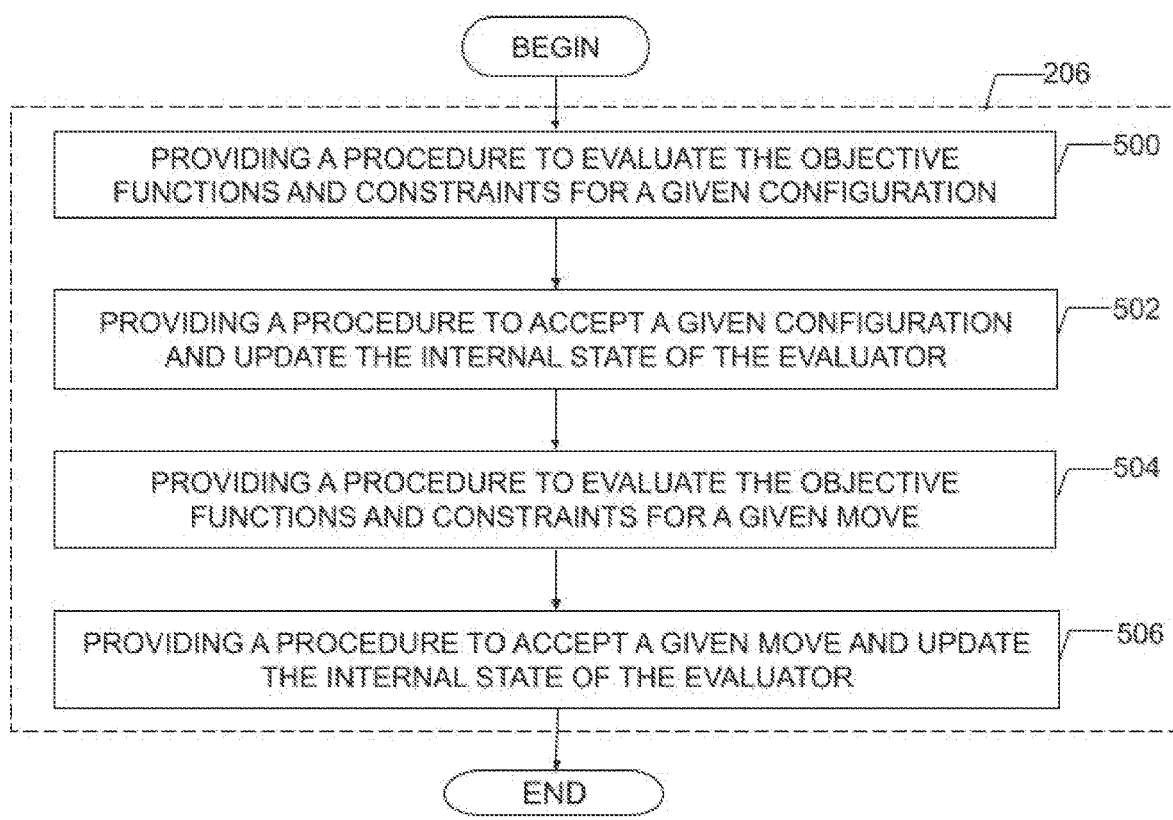
FIG. 5 is a flowchart of a procedure for initializing an evaluation method, in accordance with some embodiments disclosed herein.

FIG. 5 is a flowchart of a procedure for initializing an evaluation method, in accordance with some embodiments disclosed herein.

According to processing operation 500, the evaluation method is provided by a procedure to calculate objective functions' value and to evaluate constraints for a given configuration x. The constraints for the configuration x are evaluated to determine the violation of each constraint in C(x) and the feasibility of the configuration x.

In the travelling salesperson problem embodiment, the objective function value for the configuration x is equal to the sum of the distances travelled from city x[i] to city x[i+1] where i=0, 1, 2, . . . , n, x[0]=x[n+1]=depot. In this embodiment and since the solution space may include feasible configurations, there is no constraint to be evaluated for a configuration and constraints evaluation results are irrelevant.

In the vehicle routing problem embodiment with the additional constraint that cities i and j cannot be served by the same vehicle, the objective function value for a given configuration x equals to the sum of the route lengths over vehicles wherein the route of each vehicle is calculated following the same procedure as in the travelling salesperson problem.

In the configurations where i and j are assigned to different vehicles, the constraint evaluates to feasibility and zero violation. In the configurations where i and j are assigned to the same vehicle, the constraint evaluates to infeasibility and has a violation of one.

According to processing operation 502, a procedure is provided to the evaluation method to accept the new configuration x and update the internal state of the evaluation method.

More precisely, given the current configuration x and its corresponding objective function value and constraints evaluation, the internal state of the evaluation method including the reference configuration, the reference objective function value, and the reference constraints evaluation are updated.

According to processing operation 504, a procedure to calculate the objective functions' value and quantify the constraints evaluation for a given move is provided. In some cases, the evaluation method always interprets a move relative to its current internal state.

In the travelling salesperson problem embodiment, a move may be prescribed by swapping cities i and j in the current configuration x=[ . . . k, i, l, . . . , u, j, v, . . . ]. The objective function value for the new configuration can be obtained by updating the reference objective function $f$. The new objective function value is equal to $f-(d\ [k][i]-d[i][l]-d\ [u][j]-d[j][v])+(d\ [k][j]+d[j][l]+d\ [u]\ [i]+d\ [i][v])$ where d is the distance matrix. In this example, there is no constraint to be evaluated for the move and the constraints evaluation results are irrelevant.

Still referring to FIG. 5 and according to processing operation 506, a procedure to accept a move and update the internal state of the evaluation method is provided to the evaluation method.

Considering the same embodiment as in processing operation 504, the procedure in processing operation 506 first swaps cities i and j in x=[ . . . k, i, l, . . . , u, j, v, . . . ] resulting in $x_{new}$=[ . . . k, j, l, . . . , u, i, v, . . . ]. It then applies the same method as in the processing operation 502 to update the internal state of the evaluation method.

Now referring back to FIG. 2 and according to processing operation 208, an indication of the interface is provided as an input. In some cases, the interface acts as a layer between algorithms and generation and evaluation methods.

In some cases, the generation and the evaluation methods are wrapped into an interface interacting with at least one algorithm to draw and evaluate configurations and moves used by an algorithm. More precisely, the interface comprises methods to generate configurations and moves, to evaluate a set of objective functions and constraints for a given configuration and move. Wrapping the generation and evaluation methods by the interface is modular and flexible but it may have some overhead. In some cases, for better performance, the user may decide to directly incorporate the methods for generation and evaluation of configurations and moves into the interface. In some cases, the methods included in the interface may deal with the constraints when the interface is acting as an abstraction layer between algorithms and optimization problems.

In some cases, constraints handling procedures may be embedded in the interface to guide the search toward feasible configurations. In some cases, the search space includes both feasible and infeasible configurations, and the generation method does not necessarily draw feasible configurations or moves from the search space. Constraints handling procedures may be of various types. The list of constraints handling procedures includes but is not limited to incorporating static and adaptive penalty terms into the objective functions, rejection sampling, rejection of infeasible configurations, and extending the search space to include Lagrange multipliers, or embedding techniques such as constraint programming, linear programming, and mixed-integer programming in the search space to restrict the search space.

Figure 6:
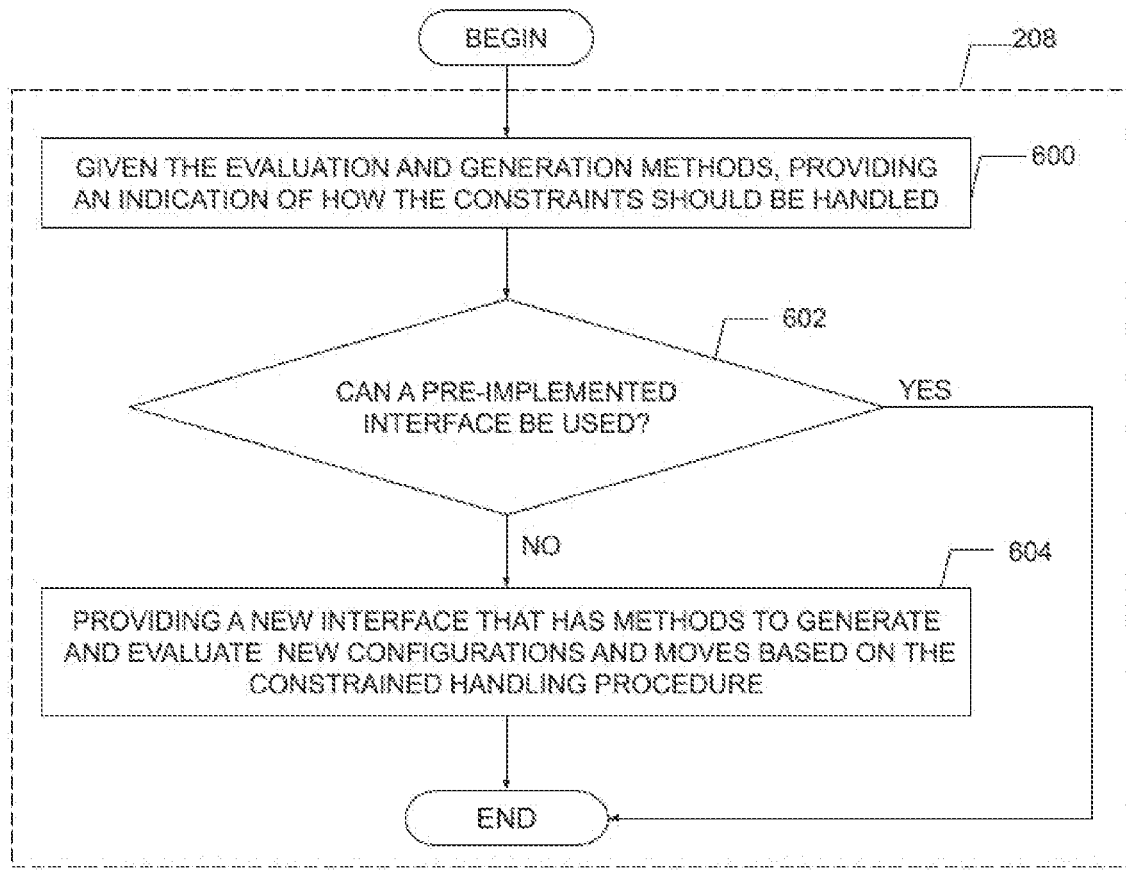
FIG. 6 is a flowchart of a procedure for integrating a generation method, an evaluation method, and a constraints handling procedure into an interface, in accordance with some embodiments disclosed herein.

FIG. 6 is a flowchart of a procedure for integrating a generation method, an evaluation method, and a constraints handling procedure into an interface, in accordance with some embodiments disclosed herein.

According to processing operation 600, a procedure for handling the constraints is provided considering the provided generation and the evaluation methods.

In some cases, the search space includes only feasible solutions, and a procedure for handling constraints may not be needed as all configurations are feasible. In some cases, the search space comprises infeasible solutions, and an interface that deals with constraints may be chosen. In some cases, the interface may be of various types. In some cases, constraints handling procedures may be chosen to be embedded into the interface. The constraints handling procedures may be any constraints handling procedures, such as any constraints handling procedures described herein. In some cases, constraints handling procedures comprise rejection sampling, static penalty terms, and adaptive penalty terms.

Still referring to FIG. 6 and according to processing operation 602, it may be determined whether a pre-implemented interface in the flexible modular computational framework FOCUS can be used or not.

In some cases, if a generation method and an evaluation method are not provided, a custom interface may be implemented, and the procedure continues to processing operation 604.

In case a custom interface is added, according to the processing operation 604, it may be provided by indications of:
procedures in the generation method for generating configurations and moves
procedures in the evaluation method for quantifying the objective functions' values and evaluating the constraints for a given configuration and move Now referring back to FIG. 2 and according to processing operation 210, at least one optimization algorithm among the suite of the pre-implemented algorithms is selected. In some cases, the algorithm is selected by a user. In some cases, the selected algorithms may be of various types, it may be any algorithm, such as any algorithm described herein. In some cases, the suite of the pre-implemented algorithms is a group of algorithms consisting of local search heuristic algorithms, simulated annealing, simulated quantum annealing, parallel tempering, population annealing, constrained population annealing, exhaustive search, greedy search, tabu search, path relinking, constrained simulated annealing, constrained parallel tempering, evolutionary search, or machine learning-based algorithms.

In some cases, there is no limit on the number of the selected algorithms. The selected algorithms utilize the generation method and the evaluation method to generate the configurations and the allowed moves and to evaluate the set of objective functions and constraints for a given configuration. The user may select available pre-implemented optimization algorithms in the flexible modular computational framework FOCUS to solve the provided optimization problem with no additional modification to the evaluation, generation, and interface methods.

Still referring to FIG. 2 and according to processing operation 212, after the optimization algorithms are selected, the parameters of each algorithm are set. In some cases, the number of parameters and the procedures for setting their values may be different for various optimization algorithms.

In some cases, wherein the selected optimization algorithm is simulated annealing, the user may set the parameters such as number of independent calls to the algorithm, number of Monte Carlo operations for each run, and the annealing schedule.

In some cases, wherein the selected optimization algorithm is tabu search, the user may set the number of independent calls to the algorithm, the number of iterations, and the length of tabu tenure.

Still referring to FIG. 2 and according to processing operation 214, the generation method, the evaluation method, interface, and the selected algorithms are provided to at least one computational platform comprising at least one processor. In some cases, the computational platform may be of various types. The computational platform may be of any suitable computational platform such as any computational platform described herein with respect to the system shown in FIG. 7. In some cases, the computational platform comprises a field-programmable gate array (FPGA), In some cases, the computational platform comprises an application-specific integrated circuit (ASIC). In some cases, the computational platform comprises central processing unit (CPU). In some cases, the computational platform comprises a graphics processing unit (GPU). In some cases, the computational platform comprises a tensor processing unit (TPU), a tensor streaming processor (TSP), a quantum computer, a digital annealer, a quantum annealer or an optical quantum computer. In some cases, the user is required to specify a computational platform to be used to run each of the procedures in the generation, the evaluation, and/or the interface methods and the selected optimization algorithms.

According to the processing operation 216, each algorithm is executed independently on the corresponding computational platform until a stopping criterion or a set of stopping criteria is met.

In some cases, wherein the selected algorithm is simulated annealing, each independent call to the algorithm stops after performing a given number of Monte Carlo operations. In some cases, wherein the selected algorithm is tabu search, the run terminates after reaching a given number of iterations.

Still referring to FIG. 2 and according to processing operation 218, after each algorithm terminates its runs, at least one solution comprising a configuration and its corresponding objective functions' values and constraints evaluation is provided.

According to the processing operation 220, the result is obtained. The result represents the best feasible solution among the solutions collected in processing operation 218.

In case, there is no feasible solution among the solutions obtained in the processing operation 218, null is provided as the result.

Figure 7:
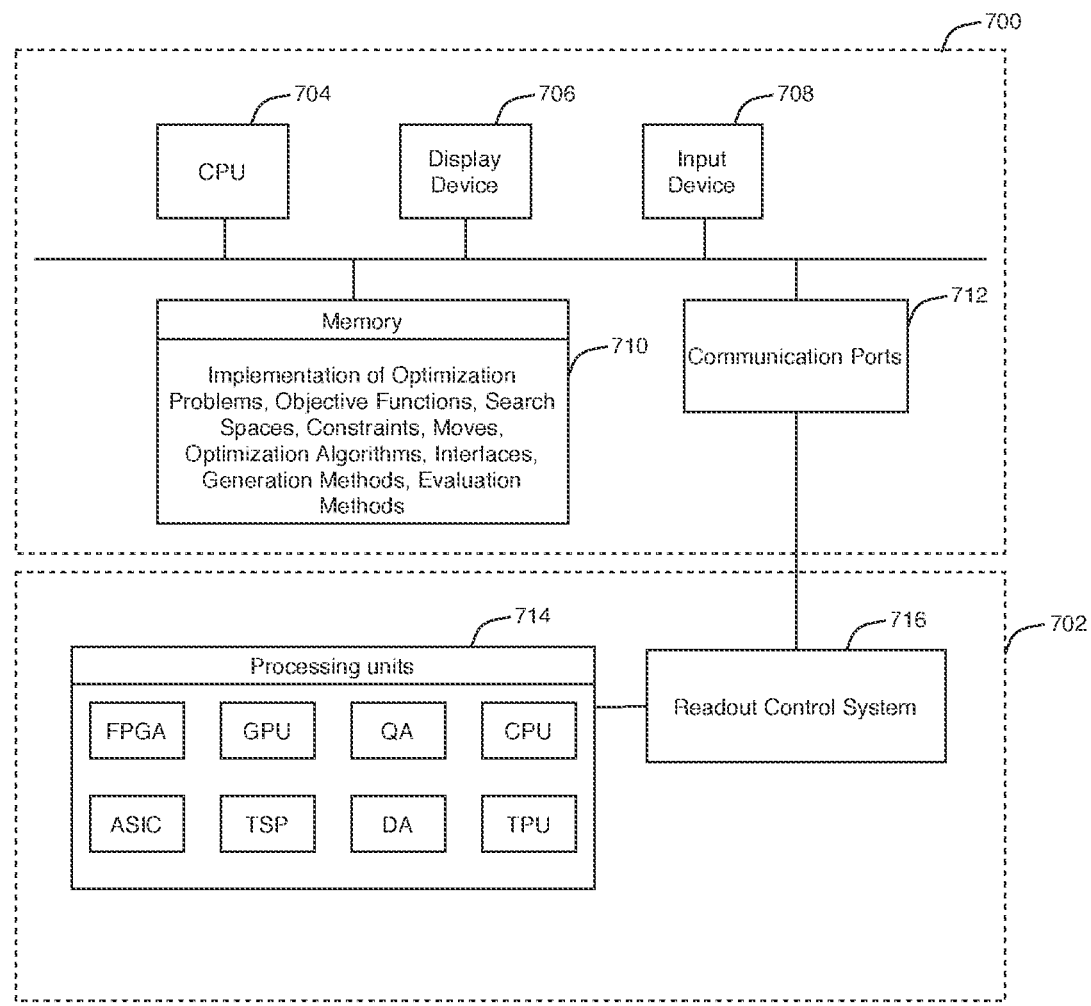
FIG. 7 is a diagram of a system for solving an optimization problem using a flexible modular approach, in accordance with some embodiments disclosed herein.

FIG. 7 is a diagram of a system for solving an optimization problem using a flexible modular approach, in accordance with some embodiments disclosed herein. The system comprises a digital computer 700 comprising at least one processing device 704 and a memory 710 comprising a computer program executable by the processing device to obtain an indication of an optimization problem; to providing data representative of a search space comprising configurations, of at least one objective function and of at least zero constraints using the optimization problem; to providing an indication of at least one generation method for generating at least one configuration and at least one allowed move; to providing an indication of at least one evaluation method for evaluating the at least one objective function and the at least zero constraints for a given configuration; to executing each of selected algorithms; to providing results comprising at least one solution to the optimization problem. The memory 710 further comprising implementation of at least zero optimization problems, objective functions, search spaces, constraints, moves, optimization algorithms, interfaces, generation methods and evaluation methods. In some cases, the digital computer 700 may be of various types, such as any digital computer disclosed herein.

The system further comprises at least one computational platform 702. The computational platform 702 comprises at least one processing unit. In some cases, the at least one processing unit 714 may be of various types such as any processing unit disclosed herein. More precisely, the at least one processing unit may comprise at least one member of the group of hardware consisting of FPGA, ASIC, quantum annealer, digital annealer, GPU, TSP and TPU. In some cases, each of the hardware may be used as part of the system, to execute the whole method, or any part of it, alone, or in combination with other hardware. In some cases, the hardware may be used for: evaluation of the objective functions given an initial configuration; evaluation of the constraints given an initial configuration; evaluation of the objective functions given a configuration and its objective functions' values, and a prospective move; evaluation of the constraints given a configuration and its objective functions' values, and a prospective move; execution of an optimization algorithm or a part of an optimization algorithm; generation of random numbers; calculation of Boltzmann factors for prospective moves; generation of new moves; generation of random solutions; execution of functions of the interface, including a part or all of the above.

The computational platform 702 is operatively connected to the digital computer 700. The computational platform further comprises the read-out control system 716.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for solving an optimization problem inputted by a user, comprising:
   (a) using an interface of a digital computer to receive an indication of:
      (i) said optimization problem,
      (ii) one or more optimization problem specifications of a plurality of optimization problem specifications,
      (iii) at least one generation method and at least one evaluation method, wherein said at least one generation method is configured to generate a configuration, and wherein said at least one generation method is further configured to transform said configuration into a new configuration using a move in a search space,
      (iv) one or more algorithms of a plurality of algorithms, wherein said one or more algorithms is configured to solve said optimization problem subject to at least said one or more optimization problem specifications using said at least one generation method and said at least one evaluation method, and
      (v) one or more computational platforms of a plurality of computational platforms, wherein said one or more computational platforms is configured to execute said one or more algorithms;
   (b) transmitting a request to said one or more computational platforms to execute said one or more algorithms, wherein upon execution of said one or more algorithms by said one or more computational platforms, said one or more computational platforms yields a solution to said optimization problem; and
   (c) providing said solution to said optimization problem from said computational platform at said interface.

2. The method of claim 1, wherein said one or more optimization problem specifications comprises at least one of: a search space comprising configurations of a plurality of search spaces, one or more objective functions of a plurality of objective functions, an allowed move of a plurality of allowed moves, or at least zero constraints of a plurality of constraints.

3. The method of claim 2, wherein said search space comprises one or more of: a search space comprising binary variables, a search space comprising integer variables, a search space comprising categorical variables, a search space comprising permutations, a search space comprising continuous variables.

4. The method of claim 2, wherein said one or more objective functions comprise one or more of: a linear objective function, a quadratic objective function, a nonlinear objective function, a non-linear convex objective function, a non-linear non-convex objective function, a look-up table objective function, or a black-box objective function.

5. The method of claim 2, wherein said at least zero constraints comprises one or more of: a linear equality constraint, a linear inequality constraint, a quadratic constraint, a non-linear parametric constraint, a look-up table constraint, or a black-box constraint.

6. The method of claim 1, wherein (a)(ii) comprises on said interface (1) presenting at least a subset of said plurality of optimization problem specifications to said user and (2) receiving a selection of said one or more optimization problem specifications from said user.

7. The method of claim 6, further comprising receiving a selection of said one or more optimization problem specifications from said user, wherein said selection comprises one or more of a selected search space comprising configurations, a selected allowed move, one or more selected objective functions, and at least one selected constraint.

8. The method of claim 1, wherein (a)(iii) comprises on said interface (1) presenting a plurality of generation methods and a plurality of evaluation methods to said user and (2) receiving a selection of said at least one generation method and said at least one evaluation method from said user; further wherein said at least one generation method generates at least one configuration from a search space and wherein said at least one generation method generates at least one allowed move within said search space; and further wherein said at least one evaluation method evaluates one or more objective functions and determines that at least zero constraints are satisfied for a given configuration.

9. The method of claim 1, wherein (a)(iv) comprises on said interface (1) presenting at least a subset of said plurality of algorithms to said user and (2) receiving a selection of said one or more algorithms from said user.

10. The method of claim 1, wherein (a)(v) comprises on said interface (1) presenting at least a subset of said plurality of computational platforms to said user and (2) receiving a selection of said one or more computational platforms from said user.

11. The method of claim 1, wherein at least one of (a)(ii), (a)(iii), (a)(iv) and (a)(v) comprises aiding or suggesting a selection by said interface.

12. The method of claim 1, wherein (b) comprises executing said one or more algorithms until a stopping criterion is met on said one or more computational platforms.

13. The method of claim 1, wherein said one or more optimization specifications further comprises at least one constraints handling procedure; further wherein said one or more algorithms employs said at least one constraints handling procedure.

14. The method of claim 13, wherein said at least one constraints handling procedure comprises at least one of: incorporating static and adaptive penalty terms into said one or more objective functions, rejection sampling or rejection of infeasible configurations, extending the search space to include Lagrange multipliers, or embedding techniques, optionally, wherein said embedding techniques comprise one or more of constraint programming, linear programming, and mixed-integer programming in said search space to restrict said search space.

15. The method of claim 1, wherein said one or more algorithms comprises one or more of: local search heuristic algorithms, simulated annealing, simulated quantum annealing, parallel tempering, population annealing, constrained population annealing, exhaustive search, greedy search, tabu search, path relinking, constrained simulated annealing, constrained parallel tempering, evolutionary search, or machine learning-based algorithms.

16. The method of claim 1, wherein said optimization problem comprises one or more of: combinatorial optimization, constrained and unconstrained binary optimization, constrained and unconstrained integer optimization, constrained and unconstrained mixed-integer optimization, constrained and unconstrained continuous optimization, multi-objective optimization, or optimization under uncertainty.

17. A system for solving an optimization problem comprising:

an interface of a digital computer, said digital computer operatively coupled to a memory comprising instructions, wherein said digital computer is configured to execute said instructions to at least: receive an indication of (i) said optimization problem, (ii) one or more optimization problem specifications of a plurality of optimization problem specifications, (iii) at least one generation method and at least one evaluation method, wherein said at least one generation method is configured to generate a configuration, and wherein said at least one generation method is further configured to transform said configuration using a move in a search space, (iv) one or more algorithms of a plurality of algorithms, wherein said one or more algorithms is configured to solve said optimization problem subject to at least said one or more optimization problem specifications using said at least one generation method and said at least one evaluation method, and (v) one or more computational platforms of a plurality of computational platforms, wherein said one or more computational platforms is configured to execute said one or more algorithms, wherein said interface is in communication with a computational platform configured to execute said one or more algorithms, to yield a solution to said optimization problem, wherein said solution to said optimization problem from said computational platform is provided at said interface.

18. The system of claim 17, wherein said interface is at least one of a user interface (UI) and a graphical UI (GUI).

19. The system of claim 17, wherein said interface is configured to communicate with said plurality of computational platforms over a network.

20. The system of claim 17, wherein said one or more computational platforms comprises one or more of: a field-programmable gate array (FPGA), an application-specific integrated circuit (ASIC), central processing unit (CPU), graphics processing unit (GPU), a tensor processing unit (TPU), a tensor streaming processor (TSP), a quantum computer, a quantum annealer, integrated photonic coherent Ising machine, or an optical quantum computer.

* * * * *